United States Patent
Loomis et al.

[11] Patent Number: 5,980,446
[45] Date of Patent: Nov. 9, 1999

[54] METHODS AND SYSTEM FOR SUBSURFACE STABILIZATION USING JET GROUTING

[75] Inventors: Guy G. Loomis, Idaho Falls; Jerry R. Weidner, Iona; Richard K. Farnsworth, Idaho Falls; Bradley M. Gardner, Idaho Falls; James J. Jessmore, Idaho Falls, all of Id.

[73] Assignee: Lockheed Martin Idaho Technologies Company, Idaho Falls, Id.

[21] Appl. No.: 08/910,098

[22] Filed: Aug. 12, 1997

[51] Int. Cl.⁶ .............................. A62D 3/00; B09B 3/00
[52] U.S. Cl. ........................ 588/250; 405/266; 405/128; 588/252
[58] Field of Search .................... 405/269, 267, 405/128, 131, 240–243; 588/253, 250, 252

[56] References Cited

U.S. PATENT DOCUMENTS

| | | | |
|---|---|---|---|
| 4,624,606 | 11/1986 | Nakanishi et al. | 405/269 |
| 4,652,180 | 3/1987 | Jenkins, Jr. | 405/269 |
| 4,776,409 | 10/1988 | Manchak, Jr. | 175/50 |
| 4,869,621 | 9/1989 | McLaren et al. | 405/263 |
| 4,981,394 | 1/1991 | McLaren et al. | 405/129 |
| 5,275,513 | 1/1994 | Geary, Jr. et al. | 405/266 |
| 5,401,452 | 3/1995 | Labowitz | 264/112 |
| 5,416,249 | 5/1995 | Crayne et al. | 588/252 |
| 5,435,843 | 7/1995 | Roy et al. | 106/705 |
| 5,542,782 | 8/1996 | Carter, Jr. et al. | 405/129 |

OTHER PUBLICATIONS

Loomis, G. G., et al., *Innovative Subsurface Stabilization of Transuranic Pits and Trenches*, INEL–95–0632, Dec. 1995.
Loomis, G. G., et al., *Innovtive Subsurface Stabilization Project—Final Report Revision* 1), INEL–96–0439, Jul. 1997.
Loomis, G. G., et al., *Innovative Grout/Retrieval Demonstration Final Report*, INEL–95/0001, Jan. 1995.

*Primary Examiner*—Dennis L. Taylor
*Attorney, Agent, or Firm*—Workman Nydegger & Seeley

[57] ABSTRACT

Methods and systems are provided for stabilizing a subsurface area such as a buried waste pit for either long term storage, or interim storage and retrieval. A plurality of holes are drilled into the subsurface area with a high pressure drilling system provided with a drill stem having jet grouting nozzles. A grouting material is injected at high pressure through the jet grouting nozzles into a formed hole while the drill stem is withdrawn from the hole at a predetermined rate of rotation and translation. A grout-filled column is thereby formed with minimal grout returns, which when overlapped with other adjacent grout-filled columns encapsulates and binds the entire waste pit area to form a subsurface agglomeration or monolith of grout, soil, and waste. The formed monolith stabilizes the buried waste site against subsidence while simultaneously providing a barrier against contaminate migration. The stabilized monolith can be left permanently in place or can be retrieved if desired by using appropriate excavation equipment. The jet grouting technique can also be utilized in a pretreatment approach prior to in situ vitrification of a buried waste site. The waste encapsulation methods and systems are applicable to buried waste materials such as mixed waste, hazardous waste, or radioactive waste.

36 Claims, 11 Drawing Sheets

METHODS AND SYSTEM FOR SUBSURFACE STABILIZATION USING JET GROUTING

CONTRACTUAL ORIGIN OF THE INVENTION

The United States has rights in this invention pursuant to Contract No. DE-AC07-94ID13223 between the U.S. Department of Energy and Lockheed Martin Idaho Technologies Company.

BACKGROUND OF THE INVENTION

1. Field of the Invention

The present invention relates to subsurface stabilization techniques useful at hazardous waste sites or other excavation areas. More particularly, the present invention relates to methods and systems for achieving subsurface stabilization utilizing nonreplacement jet grouting techniques.

2. Relevant Technology

For about the last 40 years, the U.S. Department of Energy (DOE) has been producing hazardous and radioactive waste that is currently estimated at 4.5 million drums. Various proposals have been made for storage of hazardous and radioactive waste, such as transuranic waste, but there is still a large volume of buried waste material awaiting a safe storage solution.

Hazardous waste pits and other waste sites have come under scrutiny from the Environmental Protection Agency (EPA) because rain and surface water pass through the pits and leach hazardous materials into underground water supplies and otherwise contaminate surrounding environmental areas. Various techniques have been used or proposed in order to control contaminate migration from a buried waste site.

One of these techniques that has been used is termed in situ vitrification (ISV), in which joule heat is passed between electrodes, sufficient to melt the soil substrate and incorporated wastes into a relatively homogenous magma. The resultant melt solidifies to form a glass-like monolith, which can be removed in stone-like form and broken up essentially dust-free if retrieval is desired. The effectiveness of ISV is dependent on the amount of electrically conductive and glass forming materials in the soil/waste substrate.

The ISV technology is estimated to be significantly less expensive than other remediation technologies in remediating buried waste sites containing radioactive materials. Previous studies have shown that ISV, when applied to buried wastes, is 70–90% less expensive than standard "retrieve and treat" technologies. However, the application of ISV to buried waste sites has been hampered by a number of technical issues that have been often perceived as insurmountable.

The primary concern associated with ISV processing of buried wastes has been the presence of sealed containers filled with vaporizable material in the waste. The problem is that the materials in a sealed container will vaporize and build up pressure inside the container. The built-up pressure will suddenly be released from the sealed container when the pressure exceeds the yield stress of the container, causing a pressure surge in the vicinity of the molten melt front that can either cause the melt pool to be ejected from the site or significantly overwhelm the offgas system placed over the site.

Approaches that have been used to remove pressure build up in waste sites include the elimination of sealed container conditions from the waste prior to ISV processing. These approaches include the use of vibratory rods, and the preretrieval, visual sorting, and removal of sealed containers from the waste. These approaches, however, are fraught with contamination control problems, especially for buried transuranic waste scenarios.

The vibratory rod technique utilizes a large I-beam that is vibrationally inserted at designated spacings into the buried waste matrix, destroying adjacent packaging integrity, while compacting the surrounding soil. While the vibratory rod can collapse some large voids in the surrounding soils and destroy the integrity of sealed containers such as gas cylinders in the waste, a high level of soil disturbance occurs, which may result in contamination control problems. In addition, concerns exist about the high level of disturbance associated with fracturing compressed gas cylinders in situ. Other problems are that the energetic vibrations could possibly cause some buried waste materials to rise to the surface upon removing the I-beam from the soil once the vibration process is complete, especially if the amount of soil overburden is not sufficient, resulting in contaminant spread. In addition, the fractured containers in the buried waste matrix may re-seal and cause pressurization buildups, since the voids in these containers are not totally eliminated. Primary concerns with the preretrieval and visual sorting approach are that it eliminates many advantages associated with in situ treatment of the waste by introducing additional costs associated with preretrieval, waste sorting, and contamination control.

A dynamic compaction process has also been proposed as an ISV pretreatment method to collapse voids and destroy sealed container integrity. However, the dynamic compaction process is extremely energetic, and could result in contamination control concerns at many sites. A secondary concern associated with ISV processing of contaminated waste sites is the potential transfer of highly volatile contaminants into the soils surrounding the ISV melt, effectively transferring the contaminants to another location, rather than actually treating the contaminants in situ.

Another prior technique for controlling contaminant migration has been to utilize a vehicle with an arm that has jet grouting capabilities which is used to form underground walls, such as an underground bathtub-shaped wall around a waste pit for containment of waste materials to prevent horizontal migration. Such a technique is disclosed in U.S. Pat. No. 5,542,782 to Carter et al., which discusses an apparatus for cutting soil and constructing subsurface containment barriers, such as containment walls or basins around and under contaminated soils. An elongated beam includes a cutting assembly having a conduit containing a plurality of jet ports through which high pressure fluid is ejected to impact the soil to be cut. Subsurface containment barriers are formed by a jetted slurry or other suitable material which cuts and mixes with the soil. This technique, however, does not work well in hard soil areas.

Other approaches that have been used include the use of a vibratory rod or auger to make spaced apart holes in a waste pit area and thereafter filling the holes with grout. Such a technique is disclosed in U.S. Pat. No. 4,776,409 to Manchak, which discusses an apparatus that includes a power operated vehicle that supports a vertically movable frame that may be placed in contact with the upper surface of a hazardous waste impoundment. Cutter-injectors are rotated downwardly from the frame into the impoundment to form a vertically extending zone of particled material that is treated with a detoxifying agent that may be chemical, biological, or heat. The cutter-injectors are sequentially lowered into adjacent areas of the impoundment while rotating to homogenize the hazardous waste material therein to a desired depth. Thereafter, the cutter-injectors are ly moved upwardly while rotating, and simultaneously treatment chemicals for the hazardous waste material are injected therefrom. This system would not work, however, for radioactive waste control such as for plutonium waste since the cutter-injectors are exposed to air when withdrawn.

Also, it is known to put polyvinyl chloride (PVC) pipes in holes dug in a waste pit area and to pump grouting materials through the PVC pipe.

In each of the above techniques the jet grouting used forms a single point spray in each of the holes, leaving pockets in the treated area without any grout. This results in approximately 60% of the treated area not being stabilized.

Another approach to treating buried waste is disclosed in U.S. Pat. No. 4,981,394 to McLaren et al. This patent teaches a method for disposing of hazardous waste in which chemical components are added to waste materials in a landfill to create alkaline conditions that induce precipitation of calcite. This provides a cementing action around the waste which retards leachate formation and groundwater incursion.

Accordingly, there is a need for improved methods and systems for achieving subsurface stabilization at buried waste sites under a variety of conditions for safe storage of hazardous and/or radioactive wastes, as well as at other sites where excavation activities take place.

In addition, conventional retrieval operations for removing buried waste using conventional remote excavators for either full pit or hot spot retrieval can create considerable dust. The conventional contamination control systems offered to control dust spread and thus contaminate spread have been shown to have only a 70% control over dust spread. A 98% control over dust spread is required during transuranic waste retrieval operations. As a result, there is a need for methods and systems that enhance the control over dust spread in a radioactive environment waste retrieval operation.

SUMMARY AND OBJECTS OF THE INVENTION

The present invention is directed to methods and systems for stabilizing subsurface areas such as buried waste sites. The present invention includes various methods and techniques to achieve a final stabilization storage product, a pretreatment product to aid future treatment, or an interim stabilization and retrieval product of buried waste materials. All of the methods and systems disclosed herein utilize a nonreplacement jet grouting technique. The jet grouting technique includes drilling in a predetermined location such as a buried waste pit to form a plurality of boreholes through the subsurface area thereof. A high pressure drilling system provided with a drill stem having at least one jet grouting nozzle is used to drill the boreholes in the subsurface area. A grout material is injected at high pressure through the jet grouting nozzle into a borehole as the drill stem is withdrawn from the borehole at a predetermined rate of rotation and translation. This forms a grout-filled column with minimal grout returns, which when overlapped with other grout-filled columns encapsulates and binds the waste pit area to form a subsurface monolith of grout, soil, and waste. The stabilized monolith can be left permanently in place for final storage, can be further treated, or can be retrieved after an interim storage period by using appropriate excavation equipment.

The grout material is selected based on whether long term storage, pretreatment, or interim storage and retrieval of the buried waste is desired. Thus, grout materials such as portland cement or analogs of natural cement (e.g., iron oxides, iron oxyhydroxides, etc.) may be used for a final storage approach, whereas polymer materials such as acrylic resins may be used for interim storage and retrieval of buried waste. In addition, porous grout materials with electrically conductive additives and glass formers may be used for interim pretreatment purposes. An expansive demolition grout can be added to the grout-filled columns in order to fracture the monolith when hardened, aiding the retrieval operation. The invention is particularly useful for the encapsulation and storage of buried waste including mixed waste, hazardous waste, radioactive waste, and combinations thereof.

In a preferred method for forming a subsurface monolith at a buried waste site, a thrust block having a plurality of holes therethrough is placed over a predetermined location to be treated. A weather shield such as a wind shield or encapsulating shield can be optionally erected at the buried waste site prior to commencement of drilling operations. A jet grouting drilling system is provided including a mobile drilling apparatus and a source of grout material, with the drilling apparatus including a hollow drill stem with a jet nozzle at the distal end thereof. The drill stem is inserted through a hole in the thrust block, and a subsurface area is drilled to form a borehole thereinto. A grout material is injected at high pressure through the jet nozzle into the borehole as the drill stem is withdrawn from the borehole at a predetermined rate of rotation and translation in order to form a grout-filled column in the subsurface area with minimal grout returns. The above procedure is repeated as necessary in order to form overlapping grout-filled columns. A stabilized monolith is thereby formed in the subsurface area which can be left permanently in place or later retrieved.

In a preferred system according to the present invention, a mobile drilling apparatus includes a hollow drill stem with a jet grouting nozzle at the distal end thereof, and means for dispensing a grout material at high pressure into the hollow drill stem. The system further includes means for withdrawing the drill stem at a predetermined rate of translation and rotation from a borehole in a precessed manner. The thrust block used in conjunction with the mobile drilling apparatus is structured to support the drilling apparatus, and the holes in the thrust block are preferably formed in a triangular matrix pattern. In one preferred embodiment, the drill stem comprises an outer pipe having a drill bit attached to a distal end thereof, an inner pipe disposed within the outer pipe, with the inner pipe including a plurality of nozzles at a distal end thereof, and means for rotating and withdrawing the inner pipe in a precessed manner from the outer pipe.

The present jet grouting technique can also be used for pretreatment of a buried waste site prior to in situ vitrification or glassification of the buried waste. This approach (hereafter the "jet grouting/ISV approach") is preferably used at a waste site containing large voids and/or containers filled with potentially combustible and/or vaporizable materials. The grout materials used in this embodiment are specially formulated to completely fill up all void spaces in the buried waste matrix, mix with any free liquids, and provide adequate levels of glass formers and electrically conductive materials (if necessary) while maintaining porosity (if desired). The grout materials can also be modified to solidify the waste into a relatively leach-resistant interim stabilization form, if desired, until such time that in situ vitrification is performed. If such impermeable grout is used, an engineered system of vapor relief is employed during ISV processing. The vapor relief system involves the use of a vent structure(s) such as graphite rods inserted into the ISV melt and a splash guard structure placed over the melt, which mitigate any pressurization that may occur. The jet grouting/ISV approach can be used for both final in situ disposal of buried waste, and for interim in situ treatment of buried waste prior to retrieval and ex situ disposal. A demolition grout can be applied prior to retrieval in order to ease recovery of the glasssified matrix.

In a preferred method for stabilizing a subsurface area using the jet grouting/ISV approach, the jet grouting technique is carried out at a predetermined location as described above in order to form overlapping grout-filled columns, thereby forming a monolith in the subsurface area. If impermeable grout is used, the vent structure(s) are inserted into the soil/waste matrix during this stage, prior to curing. Following the jet grouting phase, the ISV phase is carried out by inserting at least one pair of electrodes into the overburden soil at spaced positions from one another, and providing an initial electrically conductive resistance path across the electrodes. An electrical current is then passed through the electrically conductive resistance path by application of current to the electrodes in order to heat the monolith or soil about the path to its melting temperature, thereby establishing a current-carrying pathway through the molten monolith or soil between the electrodes. The application of current to the electrodes is continued until the monolith or soil between and adjacent to the electrodes has been melted. During melting, the electrodes are gravity fed into the downward advancing melt, is until a desired depth is achieved. The application of current to the electrodes is then terminated to permit cooling and solidification of the melted monolith or soil into a vitrified solid mass. Preferably, the electrodes are removed from the monolith or soil prior to solidification thereof.

Accordingly, one aspect of the invention is the use of a jet grouting operation for interim storage and stabilization of a subsurface area such as buried waste followed by subsequent retrieval. In another aspect of the invention, an expansive demolition grout is added to a grouted area to fracture a formed monolith prior to retrieval. In a further aspect of the invention, a jet grouting operation is performed with grout materials such as natural analogs of cement to provide for final stabilization of a buried waste area for long term storage. In an additional aspect of the invention, a jet grouting operation is performed in a pretreatment approach prior to in situ vitrification of a buried waste site, for either interim stabilization and retrieval or final stabilization and storage of the waste.

Accordingly, a principle object of the present invention is to provide a method and system for achieving subsurface stabilization using a jet grouting technique.

Another object of the invention is to encapsulate buried waste by using jet grouting to inject waste isolation materials into the buried waste in situ.

A further object of the invention is to provide a method and system for encapsulating buried waste for long term stabilization and storage.

An additional object of the invention is to provide a method and system for encapsulating buried waste for interim storage and retrieval.

Another object of the invention is to provide a jet grouting technique used to pretreat a buried waste site prior to in situ vitrification of the buried waste.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
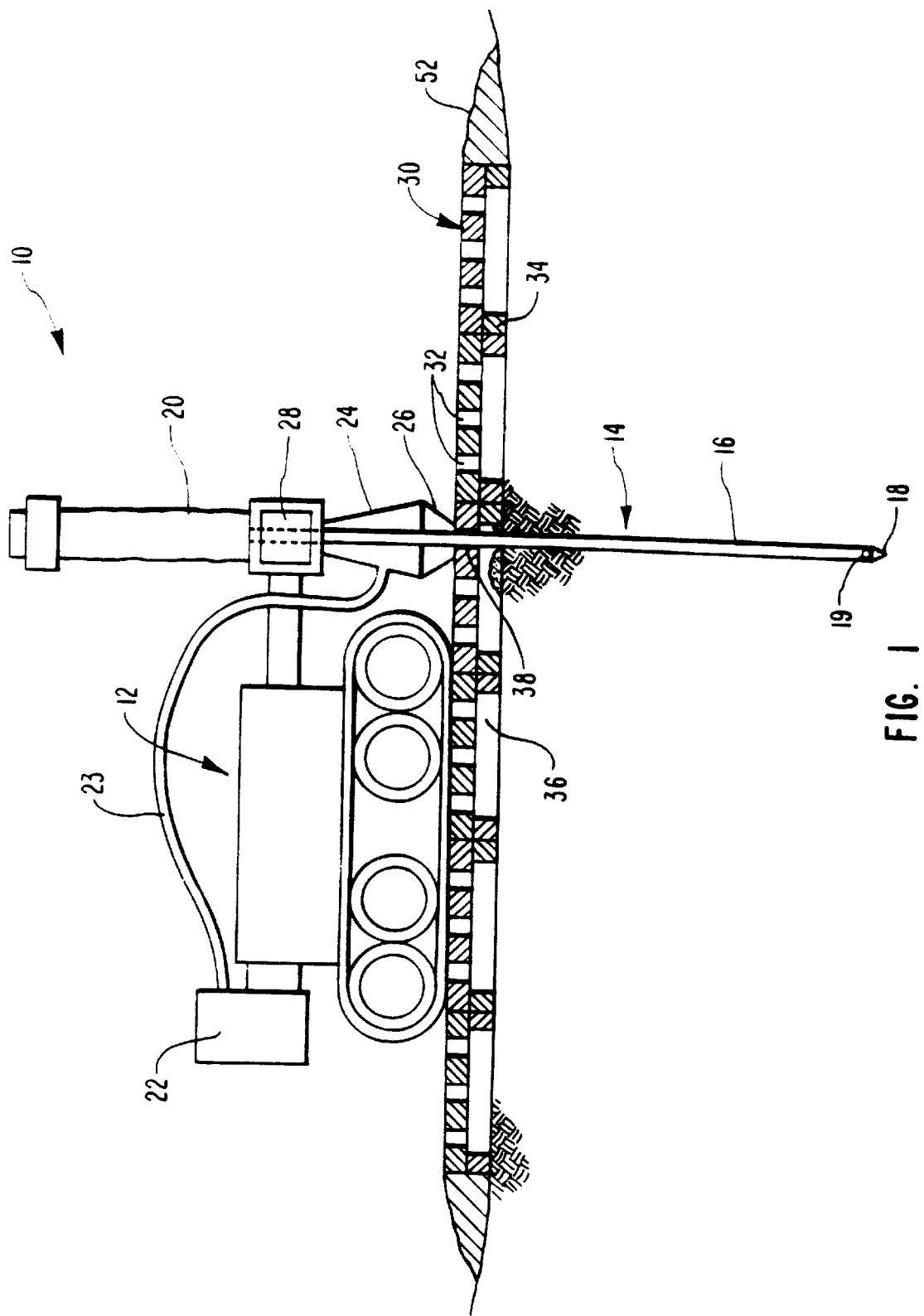
FIG. 1 is a schematic side view of the jet grouting system according to the present invention.

The present invention is directed to methods and systems for achieving subsurface stabilization utilizing a nonreplacement jet grouting technique. The present invention is particularly useful for encapsulating buried waste by injecting waste isolation/filling materials and additives into the buried waste in situ using the jet grouting technique. The systems and methods of the invention can be used in a final stabilization product approach where waste materials are permanently encapsulated and left in place underground, in an interim pretreatment approach prior to ISV processing, and in an interim stabilization product approach where the waste materials are encapsulated and stored for an interim period and then retrieved for removal to another location.

A unique feature of the present invention is that the jet grouting operation is accomplished with minimal to no grout returns, which is referred to herein as nonreplacement jet grouting. In nonreplacement jet grouting, the amount of grout injected and the method of injection ensures that the injected grout mixes with and fills voids in the waste material without buried material coming to the surface. A thrust block is preferably employed during the jet grouting operation to mitigate and control any material that might come to the surface.

The jet grouting technique can be used in various application approaches to achieve either a final stabilization product or an interim stabilization product of buried waste materials at mixed or hazardous waste sites. These include jet grouting operations which can use a variety of grout materials depending on whether final stabilization or interim stabilization of waste materials is desired. In particular, a jet grouting operation can be performed for interim storage and stabilization of a subsurface waste area followed by subsequent retrieval of the grouted waste. In addition, a jet grouting operation can be performed to form a grouted waste area following which an expansive demolition grout is applied to aid in retrieval of the grouted waste. Further, a jet grouting operation can be performed with grout materials such as natural analogs of cement or other stabilization materials to provide for final stabilization of a buried waste area. In addition, a jet grouting operation can be used in conjunction with an in situ vitrification operation for either interim stabilization and retrieval or final stabilization of waste materials as desired.

The jet grouting technique used in the above approaches includes rotational high pressure grout injection of a subsurface area such as at a buried waste site. A high pressure drilling system is utilized that includes a drill stem and drill bit provided with jet grouting nozzles, which is used to drill a plurality of holes in the subsurface area. The jet grouting nozzles are formed as part of the drill bit in such a way that high pressure injection of grout occurs during rotation of the drill bit. The drill bit serves as both a stabilizing and a cutting tool. The piercing and cutting power of the drill bit aids in punching holes through debris, destroying sealed drums of hazardous waste, sealed vaults and other impermeable or restrictive environments. The jet grouting system utilized in the present invention employs a pump system capable of pumping grouting materials such as cement or concrete to and through the entire length of the drill stem.

The jet grouting operation proceeds according to precise increments of drill stem withdrawal, rotation rate, and residence time per step, at a high injection pressure (e.g., about 6,000 psi). These settings must be able to be adjusted and reset in the field, without extensive down time. A grout material is thus injected at high pressure through the jet grouting nozzles into a waste pit as the drill bit is withdrawn from the hole at a predetermined rate of translation and rotation. In one embodiment of the invention, the drill bit is rotated about 10 degrees (10°) per each injection and rotated to a new position at about 6 second intervals. A remote pump away from the buried waste site supplies grout through the drilling system.

The grouting operation forms a grout-filled column having a diameter from about 18 inches to about 28 inches, which when overlapped with other adjacent grout-filled columns encapsulates and binds the entire waste pit area to form a subsurface agglomeration or monolith of grout, soil, and waste. The high-pressure jet injection of grout fills the void space around the buried waste thereby encapsulating the entire space. The stabilized monolith can be left in place or can be retrieved if desired by using appropriate excavation equipment. The formed monolith stabilizes the buried waste site against subsidence while simultaneously providing a monolithic barrier against contaminate migration, which improves safety in a retrieval operation. In addition, the agglomeration of contaminants and fine soil particles in the monolith decreases the chance of contaminant spread if retrieval is desired.

The waste encapsulation techniques of the present invention are applicable to the isolation and encapsulation of waste materials buried in pits or trenches such as mixed waste including various waste materials, hazardous waste, radioactive waste including transuranic element waste, and combinations or mixtures thereof. The techniques of the present invention are also applicable to the isolation of buried structures such as waste storage tanks, which can be stabilized and encapsulated by the present invention.

Typically, buried waste consists of buried boxes, drums and similar containers that can be filled with radioactive and/or other hazardous waste. In time, the containers decompose and thereby release contaminants into the surrounding soil and create subsidence events relative to the top cap over the buried waste. The high pressure injection system of the invention mixes soil with the waste isolation grouting material and forces the grouting material into the open void spaces in the buried waste site. This reduces or eliminates the permeability of the buried waste and fills the void spaces, thus preventing settling or collapse of the waste site.

The targeted buried waste sites are preferably shallow landfills (e.g., about 15–20 feet deep), which include commingled soil and containerized wastes. The targeted sites may contain liquid and/or solid wastes, contaminated with radioactive and/or hazardous materials. When a waste pit is jet grouted using the technique of the present invention, it is preferred to use an alternating triangular pattern approach so that there is more potential to puncture containers in the pit such as vertically oriented drums. The jet grouting technique of the invention stabilizes the container contents and buried waste materials in situ, without replacement. The technique of the invention can also be applied to vaults containing radioactive or hazardous materials.

Various aspects of the jet grouting system operation and methods of application will be discussed in further detail as follows.

A. Jet Grouting System and Operation

Figure 2:
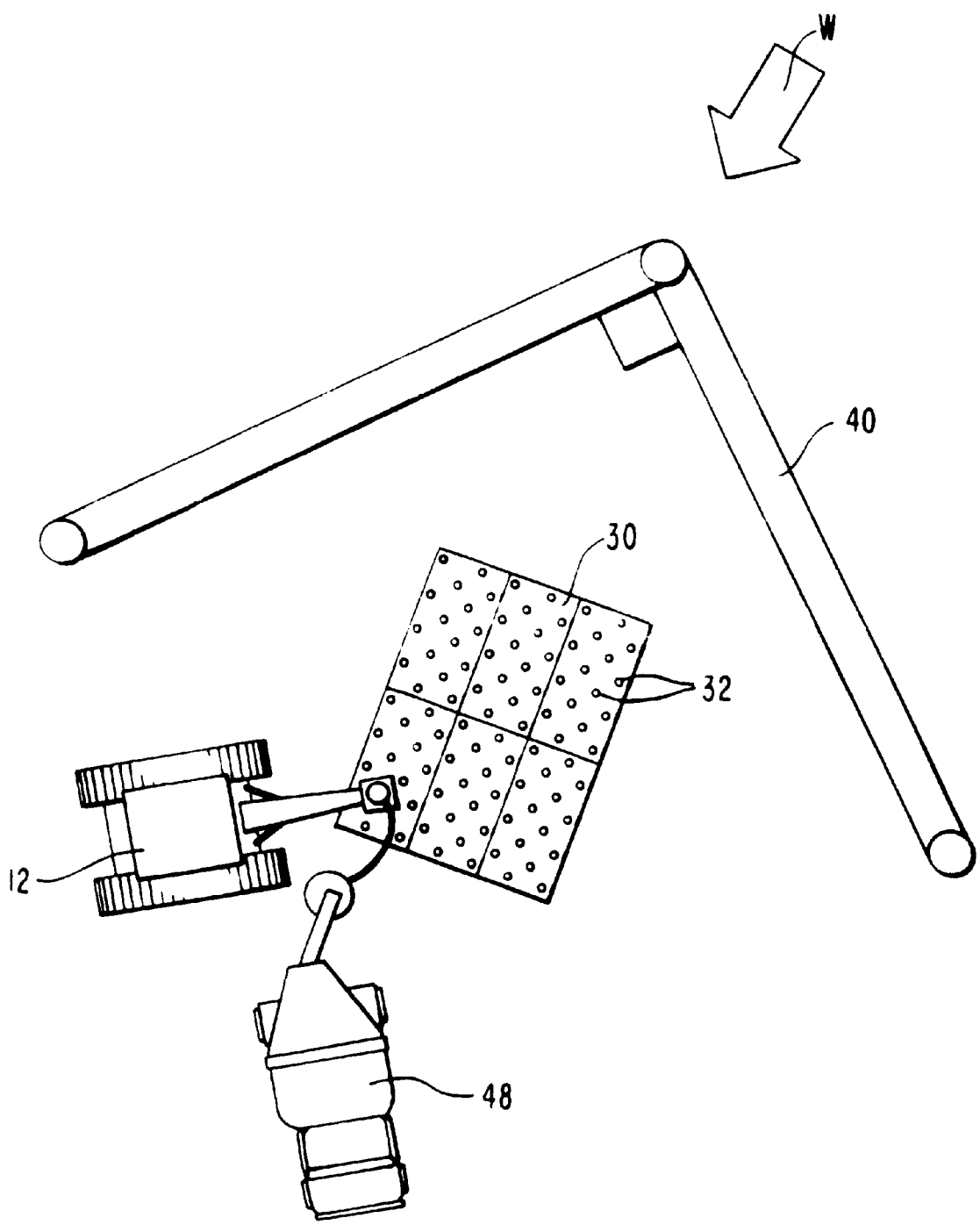
FIG. 2 is a schematic top view of the overall layout of the jet grouting system operation according to the present invention.

The overall system layout for a jet grouting operation according to the present invention is depicted in FIGS. 1 and 2. A jet grouting system 10 includes a mobile drilling apparatus or rig 12 with a drill assembly 14 for drilling into a subsurface area. The drill assembly 14 is provided with an elongated drill stem 16 with an attached drill bit 18 at a distal end thereof. The drill bit 18 has a jet grouting nozzle (or nozzles) 19 for injecting a grout material. A drill stem shroud 20 for housing drill stem 16 in a retracted position is disposed at a proximal end of drill assembly 14. A high efficiency particulate air (HEPA) filtering system 22 attached to drilling rig 12 operatively communicates via line 23 with a HEPA boot 24 surrounding a portion of drill stem 16 above ground. A catch cup 26 is disposed around drill stem 16 below and adjacent to HEPA boot 24. A plastic sheeting 28 is positioned below drill stem shroud 20 and above HEPA boot 24.

A thrust block 30 is placed over the subsurface area to be grouted as shown in FIGS. 1 and 2. The thrust block 30 has a plurality of holes 32 through the upper surface thereof for insertion of drill stem 16. A series of spacer blocks 34 are disposed between the upper surface of thrust block 30 and the ground surface in order to provide a spoils return area or void 36 underneath the thrust block 30. A wiper assembly 38 is disposed within holes 32 in order to clean the drill stem 16 of contaminants when withdrawn from subsurface area 50. The thrust block 30 is employed to mitigate and control any material that might come to the surface during the jet grouting operation.

As shown in FIG. 2, a weather shield such as a portable wind shield 40 can be optionally placed around thrust block 30 in a position to block the prevailing wind indicated by arrow W. Also shown in FIG. 2 is a grout truck 48 for supplying the grout material under pressure to drill stem 16.

Figure 3:
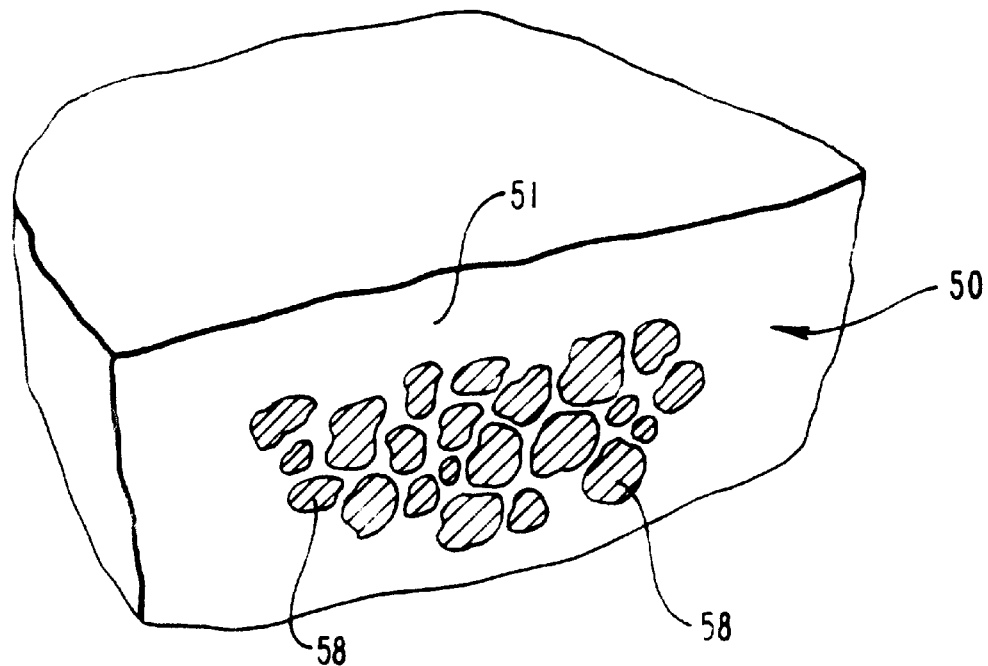
FIG. 3 is a sectional perspective view of a buried waste site to which the jet grouting system of the present invention can be applied.
Figure 4:
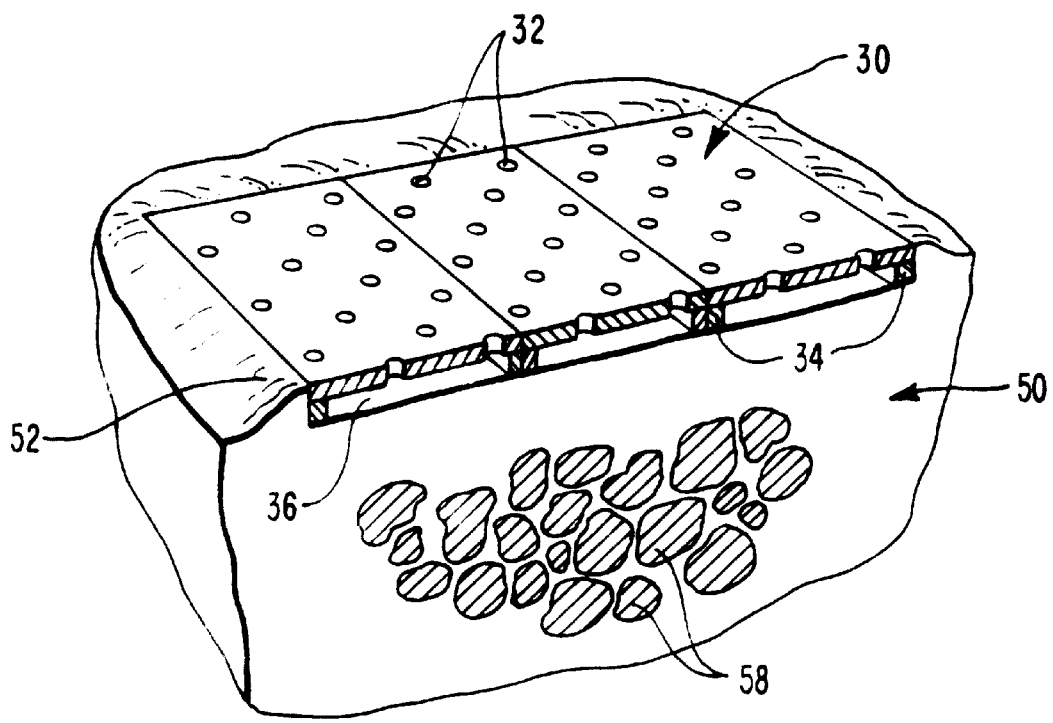
FIG. 4 is a sectional perspective view of the buried waste site of FIG. 3 to which a thrust block has been emplaced according to the present invention.

A jet grouting operation according to the present invention is illustrated generally in FIGS. 3–8. A buried waste site for jet grouting is selected having a subsurface area 50 with an overburden 51 and waste material 58 thereunder as shown in FIG. 3. The ground surface of overburden 51 is substantially leveled in the area where thrust block 30 is to be placed. Preferably, the ground surface is compacted, with pea-sized gravel placed thereover and substantially leveled. Geotechnical sensors (not shown) are also preferably placed around the site. The thrust block 30 with a plurality of preformed holes 32 is then laid down with interlocking connectors to match with the geotechnical sensors. The thrust block holes 32 are preferably offset approximately 22–24 inches from each other. As depicted in FIG. 4, the perimeter of thrust block 30 has a soil berm 52 formed therearound to provide access to and from thrust block 30 for mobile drilling rig 12 such that the transition of drilling rig 12 up to thrust block 30 is smooth.

A weather shield such as wind shield 40, shown in FIG. 2, can be erected around the work area along with stage support equipment. Such equipment can include a high pressure pump, a transfer pump, a water tank, a secondary mixer, grout supply lines, a generator, and a mobile catch tank for system clean out.

Figure 5:
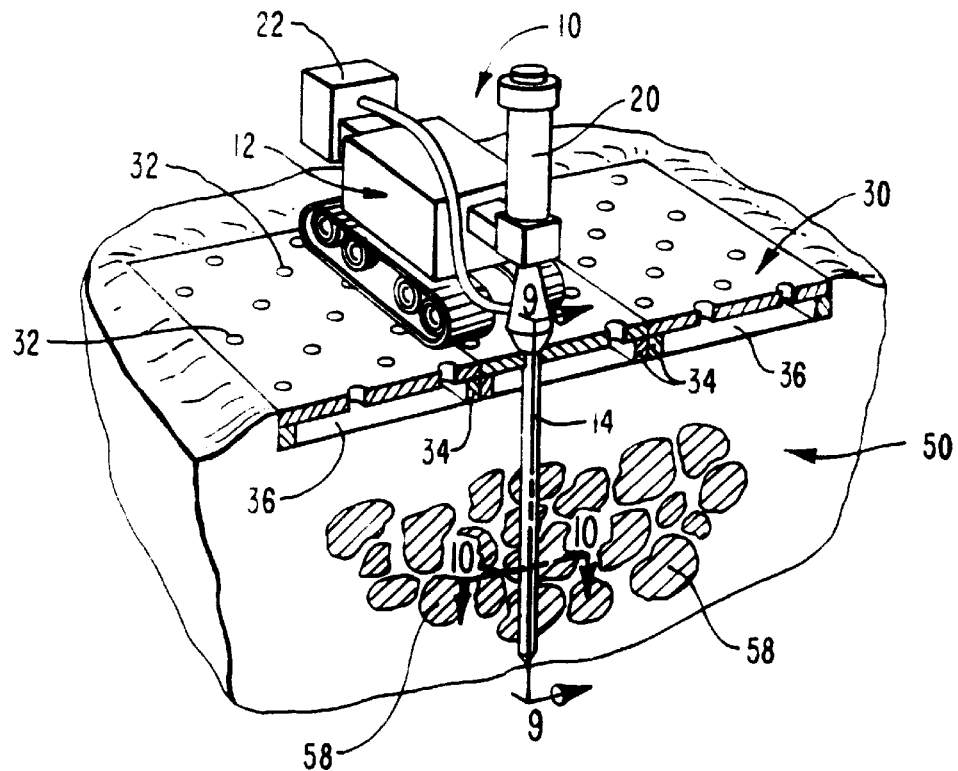
FIG. 5 is a sectional perspective view of the buried waste site of FIG. 4 on which the jet grouting system of FIG. 1 has been deployed.
Figure 6:
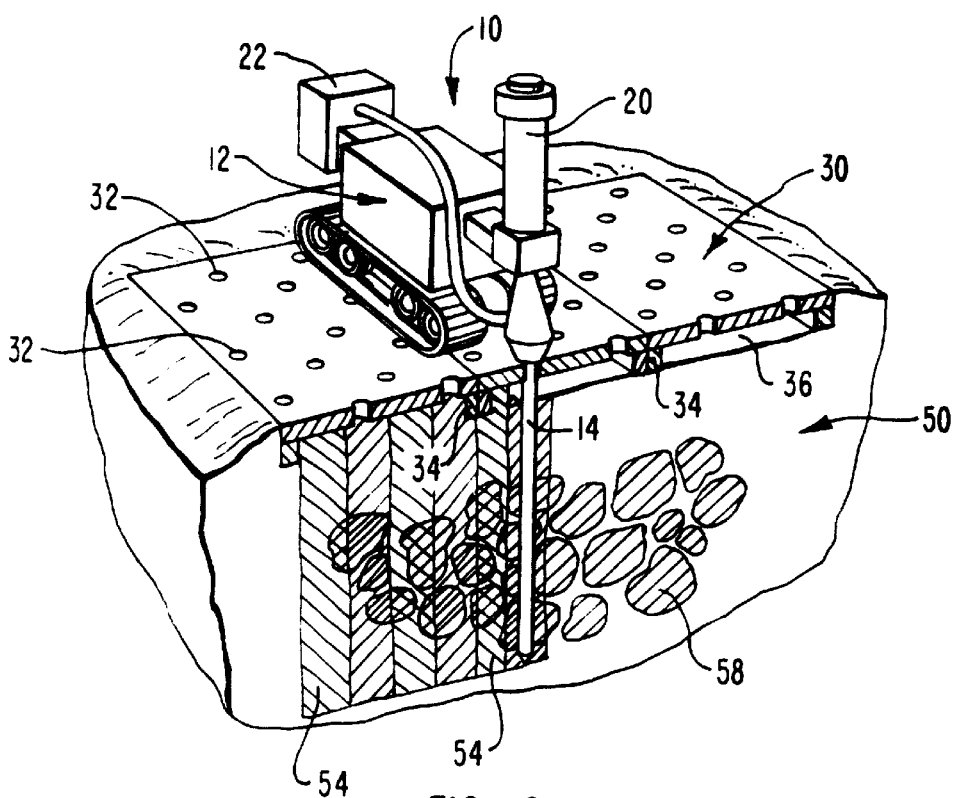
FIG. 6 is a sectional perspective view of the buried waste site of FIG. 5 showing the operation of the jet grouting system of the invention in forming overlapping grout-filled columns.

The mobile drilling rig 12 is deployed onto thrust block 30 as necessary to engage a desired hole in thrust block 30 as depicted in FIG. 5. A borehole is drilled to a maximum total depth from top of grade of about 20 ft or to the basalt interface, whichever comes first, prior to grout injection. The grout injection is then initiated, with the grout material being injected at high pressure through the jet grouting nozzles into the formed borehole while the drill stem is retracted incrementally to produce a grout column 54. The above procedure is repeatedly carried out to form adjacent overlapping grout columns 54 as shown in FIG. 6, which encapsulate and binds waste material 58 to form a subsurface agglomeration of grout, soil, and waste.

Figure 7A:
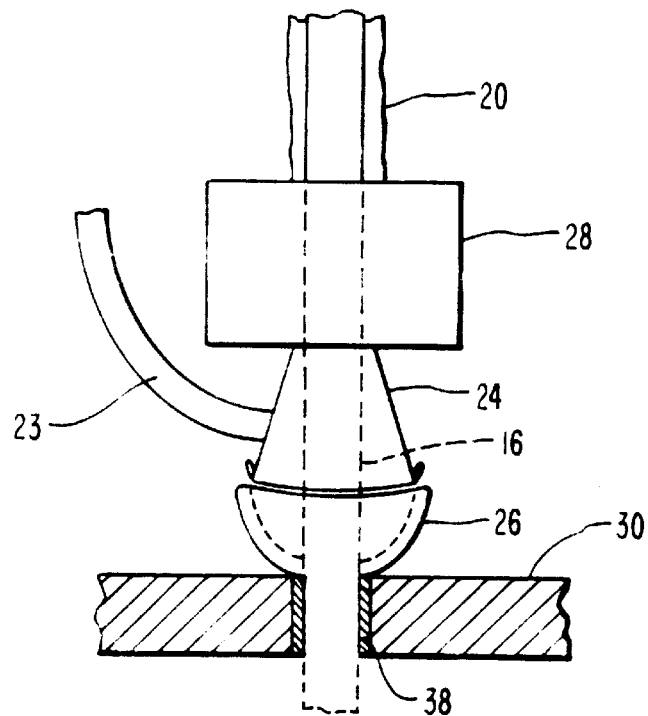
FIGS. 7A–7C are schematic side views of a technique for moving the drill stem of the jet grouting system to adjacent holes for jet grouting without contamination spread, according to the invention.
Figure 7B:
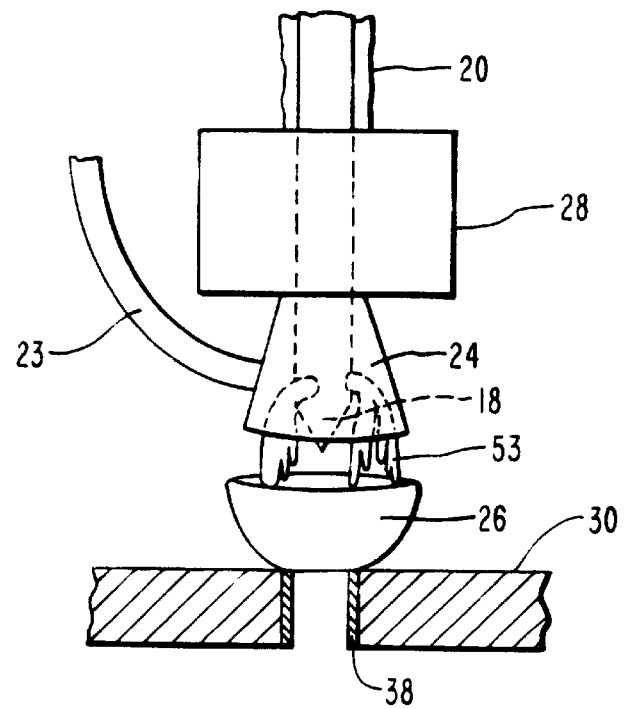
Figure 7C:
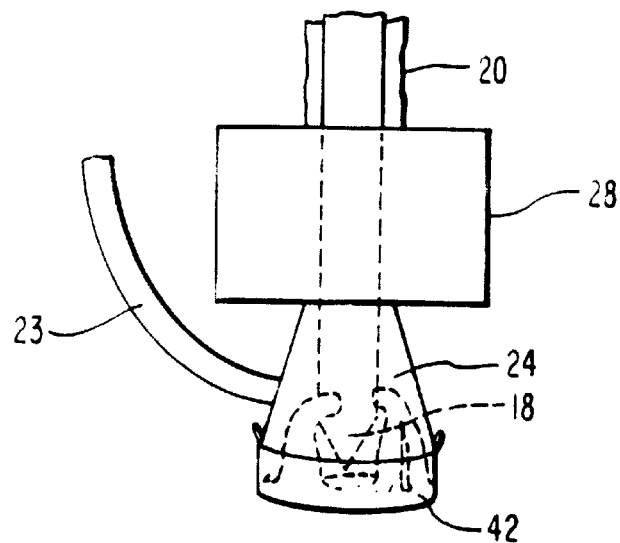

A preferred technique for moving drill stem 16 to the next hole 32 in thrust block 30 to be grouted is shown in FIGS. 7A–7C. A deployed drill stem 16, as shown in FIG. 7A, is retracted so that drill bit 18 (not shown) is within about 5 ft of the ground surface, and pump pressure is reduced to a nominal flow. The drill stem 16 is then retracted until drill bit 18 is within boot 24 as shown in FIG. 7B. The grout material 53 is directed into the spoils return area beneath thrust block 30 such that the remaining space thereunder is filled with grout under low pressure flow. As shown in FIG. 7C, a grout catch reservoir 42 is then installed over the lower portion of boot 24 to prevent leaking of grout, and the drill stem 16 is then positioned over the next designated thrust block hole for drilling.

Figure 8:
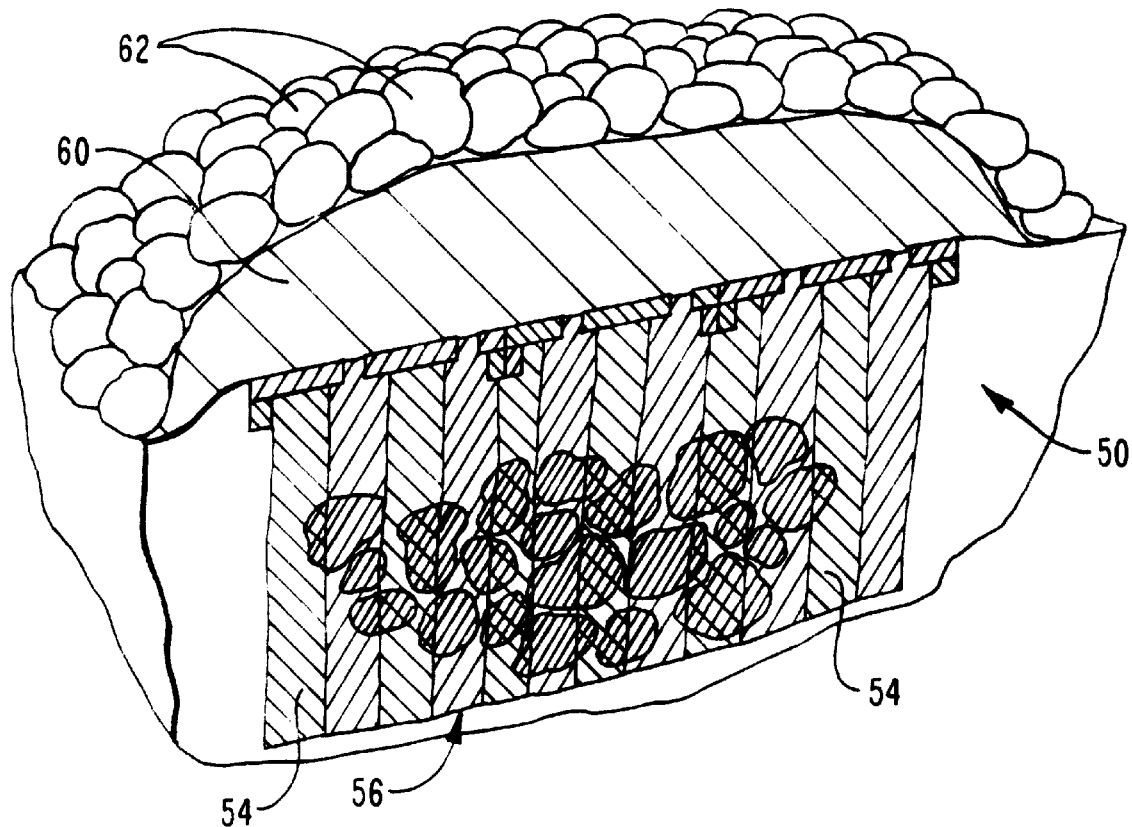
FIG. 8 is a sectional perspective view of the buried waste site of FIG. 3 in which is formed a subsurface monolith by the jet grouting operation of the invention, with a cap placed thereover.

As shown in FIG. 8, once the grouting has been completed, a monolith 56 is formed from the overlapping grout columns 54. When monolith 56 is to be left in place for permanent storage, a cap 60 can be placed thereover as depicted in FIG. 8. The cap 60 can include an optional stone covering 62 such as basaltic cobble, gravel, or other suitable material. The entire thrust block 30 is buried under cap 60, and all contaminated grout materials are preferably deposited into thrust block 30 (e.g., grout removed from a plugged nozzle or drill stem, etc.). When monolith 56 is to be retrieved after an interim period, the jet grouting operation is carried out as described above, except that the overburden is removed prior to laying down the thrust block. If desired, preset holes can be formed in the grouted matrix, prior to curing thereof, for emplacing demolition grout to aid in retrieval of monolith 56.

Figure 9:
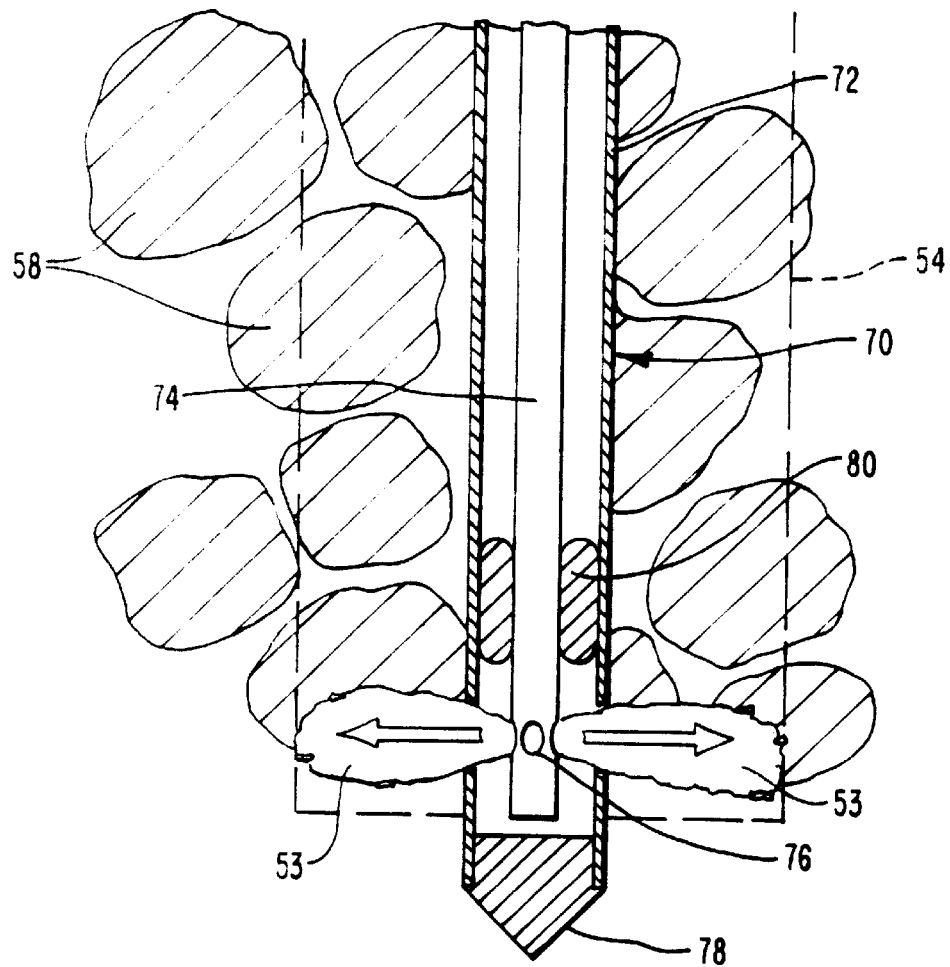
FIG. 9 is a schematic side view of a pipe-in-pipe drill stem used in one embodiment of the jet grouting system of the present invention.
Figure 10:
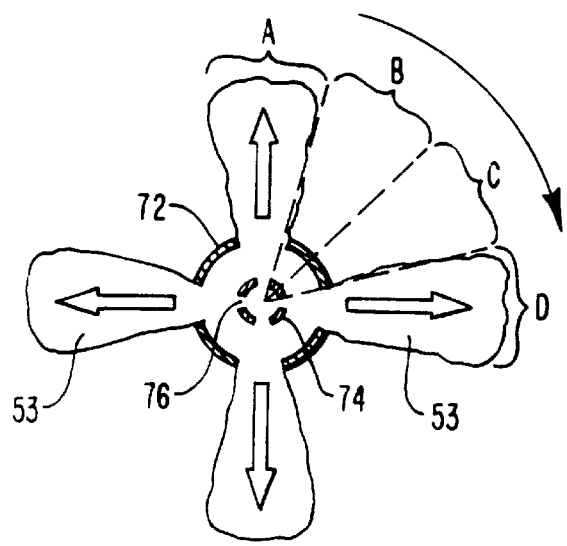
FIG. 10 is a top sectional view of the pipe-in-pipe drill stem depicted in FIG. 9.

A preferred embodiment of the drilling apparatus used in the present invention includes a pipe-in-pipe drill stem system 70 as shown in FIGS. 9 and 10, including an outer pipe 72 and an inner pipe 74. The outer pipe 72 is preferably made from a plastic material such as PVC, polyethylene, ABS (acrylonitrile butadiene styrene), and the like. The outer pipe 72 has a drive point 78, preferably made from carbon steel, attached to the distal end thereof. The inner pipe 74 is preferably a high pressure pipe formed with a plurality of jet grouting nozzles 76.

In operating the pipe-in-pipe system 70 according to the procedures described above in relation to FIGS. 3–8, a standard steel drive rod (not shown) on mobile drilling rig 12 is placed inside outer pipe 72 on top of drive point 78, and outer pipe 72 is driven into the ground. The inner pipe 74 is then placed into outer pipe 72, and a packer 80 is disposed in the space between outer pipe 72 and inner pipe 74, as shown in FIG. 9, to pack off the bottom. A high-pressure hose (not shown) is attached to inner pipe 74 to provide communication with a high-pressure injection pump (e.g., 11,000 psi). The inner pipe 74 can also be attached to a means in the drilling assembly for rotating and withdrawing inner pipe 74 from outer pipe 72 in a precessed manner. A ratchet assembly is placed on the thrust block to hold inner pipe 74 in position.

FIG. 10 shows a sectional top view of the pipe-in-pipe system 70, with inner pipe 74 rotating within outer pipe 72 to various positions labeled A, B, C, and D. As shown in FIG. 10, inner pipe 74 is rotated or precessed in approximately 4 increments at any given axial position and is maintained at one of positions A–D for about 30 seconds during jet grouting. The grout material cuts through outer pipe 72 at each position when injected and penetrates the soil/waste matrix to form a grout column 54, which can have a diameter from about 18–28 inches. The inner pipe 74 is rotated or precessed to obtain complete coverage of the subsurface area being treated. The outer pipe 72 is destroyed in the process and becomes part of grout column 54 as the jet grouting takes place.

B. Contamination Control

The present invention provides an inherent contamination control capability in that the contaminants and soil particles are agglomerated into a soilcrete mixture formed from the jet grout that is not easily aerosolized. Prior contamination control techniques use water sprays, fixant systems, and dust suppressants involving complicated deployment. The present grouting technique offers enhanced contamination control especially during retrieval operations. The present invention allows the retrieval of buried hazardous waste and transuranic wastes in a more simplified and efficient monolithic manner, reducing the need for elaborate contamination control schemes.

The jet grouting operation according to the present invention includes a contamination control system which utilizes many of the components discussed above in three (3) subsystems. These include 1) the weather shield; 2) the thrust block and drill stem wiper assembly; and 3) the drilling rig equipment including the shroud, drill stem boot assembly, and the HEPA filtering system. Each of these subsystems will be discussed in detail as follows.

1. Weather Shield

A weather shield such as a wind shield or an encapsulating shield can be used during grouting operations and in coring/post grouting monitoring activities. The purpose of the wind shield is to provide a temporary barrier to prevailing winds to eliminate splatter of grouting material and also to facilitate obtaining air monitoring samples. Any support wires for the wind shield should extend toward the prevailing wind to keep the work area uncluttered. In addition, the wind shield may have a covered top to focus wind over the top of the grouting operation. Alternatively, the encapsulating shield can be erected over the entire drilling operation area if desired, to provide protection from swirling winds or other forces of nature.

The weather shield should be completely portable, constructed out of easily obtainable materials, easily erected in high wind conditions (e.g., winds of about 20–40 miles per hour), and easily disassembled. In addition, the side walls of the weather shield should be sealable to the ground such that no air currents can enter thereunder.

2. Thrust Block and Wiper Assembly

The jet grouting operation can have the potential for contaminated materials to rise to the surface in either holes that have been jet grouted previously or around the outside diameter of the drill stem during grouting. These rising materials are called grout returns or spoils. In any one hole that is grouted, these grout returns can be from about 3–5 gallons. The present invention handles these grout returns by using the thrust block. The thrust block contains the grout returns thereunder and is configured to maintain a clean surface on top of the thrust block. The jet grouting operation is an inherently dirty operation in that grout drippings and grout return materials are prevalent during all phases of the operation. To operate with no grout drippings and no grout returns in areas where workers move freely, requires a specially designed system to mitigate these tendencies.

The thrust block can be constructed of prestressed concrete, wood, plastic, or some composite of these materials. Any reinforcing material used must be nonmetallic (e.g., fiberglass reinforcement or wooden dowels can be used) if a metallic-based monitoring system is used. Otherwise, various metallic materials can be used as a reinforcing material for the thrust block. The thrust block can be either poured in place or constructed off site and placed over the pit as a modular design. If brought in as a module, a lifting system for the thrust block is provided for easy lifting from a transport truck bed to the site of application.

The thrust block needs to be able to support a drilling rig which can weigh up to about 15 tons. In addition, the thrust block needs to withstand movement of the drilling rig equipment over the entire surface thereof without cracking or shifting of modules if modular. If a modular thrust block is used, a locking key and slot technique or other suitable means can be used to connect one module to another. The various modules are thereby held together against rotation due to movement of the drilling a rig. If locking keys are used, they should be constructed of a nonmetallic material if there is concern of interference with subsurface monitoring efforts, and should be flush mounted to the top surface of the thrust block. In addition, PVC pipes acting like stabilizing stakes can be driven into the surrounding soil around the thrust block, or epoxy bolts can be used to bolt the modules to the ground surface.

The thrust block preferably covers the entire area to be jet grouted and is constructed or placed in open air prior to placement of the weather shield. The thrust block has preformed holes preferably from about 5 to 5.5 inches in diameter therethrough, to provide clearance for a drill stem nominally 4 9/16 inches in diameter. The thrust block holes are preferably at about a 90 degree angle relative to the ground surface. Hole spacing can be determined based on performance of selected grout materials, and waste packaging dimensions.

A wiper assembly which can be made with artificial or natural sponge, closed cell foam packing, or a neoprene material, is attached to the inner surface of the thrust block holes preferably with epoxy glue. The wiper assembly contacts the inserted drill stem to provide for decontamination of the drill stem when withdrawn. The wiper assembly also simultaneously acts as a barrier against minor splash of grouting materials as the drill stem is withdrawn.

The holes in the thrust block accommodate a removable formed rubber cone or catch cup that is inserted into the holes. The top surface of the catch cup is preferably at least about 2 inches in diameter larger than the HEPA boot discussed in further detail below. If desired, the catch cup can be threaded to a nylon ring formed in the thrust block hole such that there is a tight seal. In addition, the wiper assembly can be formed as an integral part of the catch cup and can be reusable. In other words, each hole through the thrust block can have only a nylon female thread in which the catch cup/wiper assembly is inserted just prior to grouting.

The hole spacing in the thrust block can be determined based on field trials to define the dimensions of grouted columns. A triangular pitch matrix is preferably employed for the hole location in the thrust block. In one embodiment of this matrix, any one hole on a row is about 24 inches from its neighboring hole; however, the rows are about 19 inches apart. This results in the holes of the two arms of the triangle being about 22.5 inches apart, with about a 24 inch base for the triangle. To cover a nominal 20'×20' area requires 133 holes if a 24 inch spacing between holes is desired in the thrust block. It should be understood that other hole spacing dimensions may be utilized as desired for a particular site.

As shown in FIG. 2, thrust block 30 includes six (6) identical panels, although any number of panels may be utilized as needed. Each panel or module of the thrust block is basically of a box lid design in the embodiment shown. It may be desirable to modify the leading edge of the thrust block to be tapered such that when placed on the top surface of the soil, the taper pushes into the soil and stabilizes the modules against shifting. In addition, cross beams may be added as needed under the thrust block to provide further support. Other structural modifications can be made to the thrust block as desired to meet the needs of a particular site.

The volume under the thrust block is preferably large enough to accommodate up to about 8 gallons of spoils per drill hole. For example, assuming that for each panel of the thrust block there is a maximum of 28 holes, and assuming 8 gallons of returns per hole, the total volume under each panel needs to contain about 224 gallons. This results in a theoretical vertical spacing of about 5 inches under each panel. In a preferred embodiment, the top surface of the thrust block is about 6 to about 8 inches thick depending upon the materials used, and the vertical void space is about another 5 inches, resulting in a total height of the thrust block of about 11 to about 13 inches.

Figure 14:
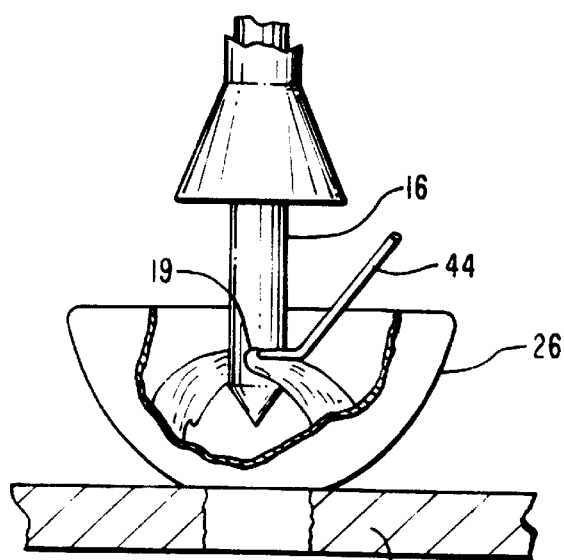
FIG. 14 is a schematic side view of a technique for cleaning a plugged drill nozzle of the jet grouting system according to the invention.

A technique for clearing plugged injector nozzles during a grouting operation is depicted in FIG. 14 and involves using various features of the thrust block. When a grouting nozzle 19 becomes plugged during a jet grouting operation, the drill stem 16 is removed from the hole and positioned over catch cup 26 on thrust block 30. An angled rod 44 such as an angled wire is then used to clean out the plugged nozzle 19 of drill stem 16. Radiation monitoring personnel can determine the personnel protective equipment (PPE) required for unplugging operations, and with their approval, used PPE (gloves, etc.) can be placed in the grout holes. If clearing the nozzle does not work using this technique, an established procedure can be used to release the pressure in the line away from the drilling rig and the entire lower nozzle assembly can be removed, with the nozzle set aside for eventual disposal and a new nozzle installed.

Figure 15A:
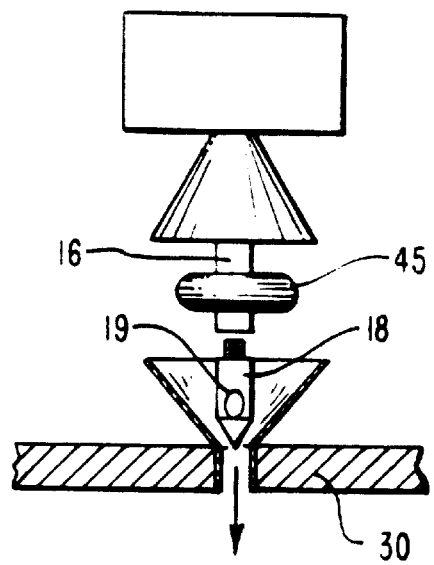
FIGS. 15A and 15B are schematic side views of a technique for cleaning a drill stem of the jet grouting system according to the invention.
Figure 15B:
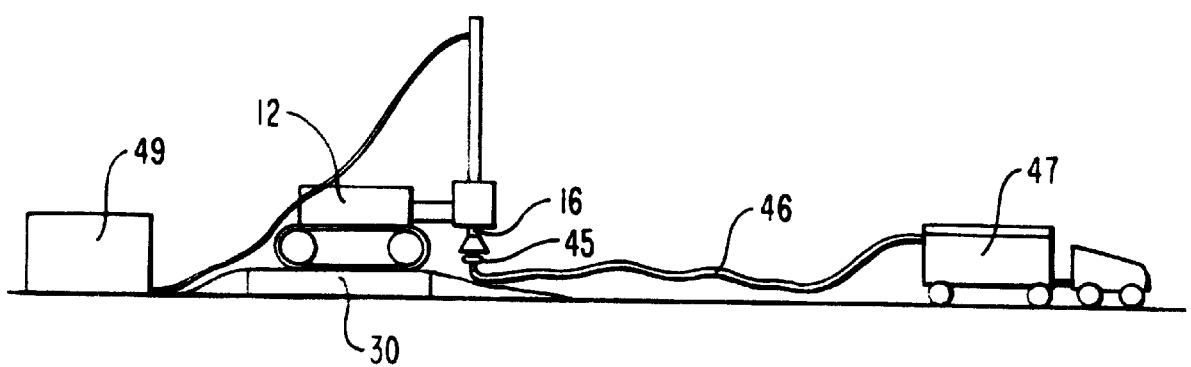

Another technique, shown in FIGS. 15A and 15B, can be used if plugging has occurred in the drill stem and a clean out is required. The drill bit 18 with nozzle 19 is removed from drill stem 16 and donut device 45 preferably made of rubber is placed around drill stem 16. A fire hose 46 is then attached to the bottom of drill stem 16. The donut 45 is required to keep contaminants from flowing down drill stem 16 into the clean fire hose 46. The fire hose 46 is routed from drilling rig 12 to a mobile covered collection tank 47, and grout and/or water is flushed or cycled through drill stem 16 as needed using a high pressure injection pump 49.

A similar procedure can also be used for clean out of the drilling system at the end of an operational shift. The drill bit is withdrawn into the catch cup on the thrust block and the exterior of the drill stem is sealed off above the drill bit with a rubber donut. The drill bit is then removed and placed on plastic sheeting in a laydown area. A fire hose is attached to the end of the drill stem and extends to a mobile collection tank. Water is then circulated to clean out grout from the entire drilling system. Thereafter, the fire hose is removed and a new drill bit can be attached to the drill stem.

There are two options for final disposal of the drill stem and accumulated nozzles. One option is to decontaminate this equipment using damp CHEM WIPES or an equivalent cleaning material. Alternatively, the equipment can be set aside on plastic sheeting away from the drilling operation for later disposal.

3. Drilling Rig Equipment

The jet grouting operation of the invention uses a flexible vent hose or shroud over the drill stem, a HEPA boot assembly, and a HEPA filtration system attached to the drilling rig. An additional shroud such as plastic sheeting over the lower chuck assembly is also used. The HEPA filtration system preferably filters out about 99.9% of all particles that are about 0.37 microns or larger, and the system is capable of drawing a negative pressure of about 0.1 inches of water when positioned on top of the thrust block catch cup.

The used drill stem is preferably disposed of in a just grouted hole following completion of the last hole during a grouting operation. However, it is preferable to decontaminate the drilling mast apparatus. The upper chuck assembly and high pressure swivel should be clean; however, the lower chuck assembly may be required to be disposed of at a low level waste pit following examination by health physics personnel. All shrouds and plastic sheeting are also disposed of as secondary waste. Because of these constraints, preferably this equipment is easily detachable in the field from the drilling rig.

C. Grouting Materials

In general, conventional waste isolation materials degrade and lose effectiveness with time because they are not in thermodynamic equilibrium with the natural environment in which they are applied. If the rate of degradation is less than the decomposition rate of, for example, encapsulated radio nuclide or organic materials, then the encapsulation strategy is successful. If the contaminants do not degrade with time, then the contaminants will be released to the environment as the waste encapsulation material degrades. Thus, the contaminant release rate must be at an acceptable level.

At many waste sites, the waste includes radioactive or other contamination which is predicted to remain hazardous for thousands of years. This requires that the waste isolation material also remain effective for thousands of years. If the waste isolation materials are not in thermodynamic equilibrium with the natural environment they must eventually degrade and decompose. Containment failure is virtually guaranteed if conventional waste isolation materials are required to have an effective lifetime longer than about 100,000 years.

If long-term in situ storage is desirable, the grout material used must produce a waste form that can withstand the chemistry of the waste, be compatible with site specific parameters, and contain the contaminants within acceptable levels, all for long periods. Grouts used for in situ stabilization and retrieval of buried waste do not have as rigorous of a demand on the durability of the waste form they produce, since the stabilized waste can be repacked or further treated after retrieval. In addition, the grout must set or cure in place without interference from the buried waste or geochemistry of the site. After curing, the ability of the waste form to be easily broken should not change over the short term, and the waste form should have reasonable short-term durability in case retrieval operations are delayed.

A wide variety of grouting materials to isolate waste can be utilized in the present invention depending on the application desired. These waste isolation materials function by preventing the migration of waste components from the waste site. This is accomplished by 1) a physical barrier which prevents water from reaching the waste and thus dissolving and transporting waste components, 2) a chemical barrier which prevents the movement of waste components from the waste site by a chemical reaction for removing waste components from water, or 3) a combination of chemical and physical barriers. Stabilization of the soil at a buried waste site by the grout material prevents horizontal migration of contaminants. Thus, grout materials are preferably selected to meet the soil conditions in the area of interest.

Suitable grouting materials that may be used include cementitious, inorganic, and organic materials. These can be used in single-fluid, dual-fluid, or preheated applications depending on the grout material that is used. The grout material is selected in order to create a monolithic block or structure out of the soil/waste matrix that simultaneously stabilizes the waste against subsidence and contains the contaminants against future migration. The grout material is applied using the jet grouting technique of the present invention in order to fill void spaces and prevent collapse or slumping of waste sites.

The grouting materials are utilized for stabilizing and encapsulating buried waste sites for either in situ disposal, interim pretreatment, or interim in situ storage and eventual retrieval. The variables in grouting materials are chemical composition, chemical compatibility with the waste and surrounding environment, curing properties, compressive strength and retrievability of the matrix, how the various compositions are injected into the buried waste, and what additives are needed to enhance final treatment (for pretreatment concerns). Nonlimiting examples of suitable grout materials include portland cement, type-H portland cement, standard grout, paraffin, ethylene epoxy materials, lignosulfonate epoxy materials, hematite, two-component epoxy materials, and many others. The choice of specific waste a isolation grouting materials depends on the specific application. The grout materials used can vary in viscosity from about 1–30 centipoise, materials with particle sizes up to about 3 mm in diameter.

Preferred grouting materials for use in the present invention include analogs of natural cements for permanent stabilization and storage of buried waste, and synthetic polymer materials for interim storage and retrieval of buried waste. These will each be discussed in further detail as follows.

1. Analogs of Natural Cements

For a final stabilization approach it is desirable to use grouting materials with long term storage capability in a subsurface area. Such materials include synthetic analogs of natural cements which can be used to encapsulate and isolate waste materials from the natural environment for geologic time periods. These analogs of natural cements convert unconsolidated waste material into impermeable and durable rock, which produces a permanent (in terms of geologic time) in situ encapsulation and isolation of the buried waste materials from the environment. The void space in the buried waste is filled with rock-like material, which permanently eliminates the possibility of collapse or slumping of the waste site. In addition, the analogs of natural cements are inexpensive and safe to apply when used for encapsulating waste materials.

Analogs of natural cements provide suitable waste isolation materials which are in equilibrium with the natural environment in which they are placed. If equilibrium is achieved, then such materials will remain intact as long as the natural environment is not significantly altered or changed. Examples of natural cements include calcite ($CaCO_3$), iron oxides and oxyhydroxides such as hematite ($Fe_2O_3$), various forms of silica ($SiO_2$), gypsum ($CaSO_4 \cdot 2H_2O$), and many other minerals. The common natural cements in sedimentary rocks are dated at greater than 1.5 billion years. The existence of such rocks for this long time period requires that they be in chemical equilibrium with their surroundings. Consequently, the long-term behavior of waste isolation materials such as chemically identical analogs of natural cements can be reasonably predicted in the natural environment.

The use of analogs of natural cements in the technique of the invention prevents migration of contaminants by forming natural encapsulating materials which are in equilibrium with the natural environment. This prevents leaching or any other migration of waste into the surrounding environment. The reagents required for certain applications of analogs of natural cement to isolate buried waste have high reaction rates and also certain soils and buried waste have very low permeability. These conditions require a dynamic injection system such as the jet grouting technique of the present invention, which can mix the reagents during injection. This results in a thermodynamic equilibrium of the grouted waste with the environment, which produces long term stabilization of the waste site. Preferred analogs of natural cement for use as a grouting material in the present invention include iron oxides and hydroxides which are stable in virtually all natural environments. These compounds can be used to form monoliths which stabilize the waste for an estimated 10,000 years. The iron oxides, including hematite ($Fe_2O_3$), goethite (FeO[OH]), magnetite, ferric-ferrous iron oxides and oxyhydroxides, and others, are preferred waste encapsulation materials because these minerals are formed by natural processes in most soils. The presence of iron oxides in soils indicates that it is virtually in equilibrium with the natural environment and would be expected to last indefinitely as a waste encapsulation material.

Iron oxides and oxyhydroxides are natural cements and have advantages in comparison with calcite as a buried waste isolation material. Iron oxides are stable in a much broader range of chemical environments than calcite. The iron oxides are stable in virtually all natural environments at the earth's surface in contact with air and ground water systems. The iron oxide minerals are casually observed as common rust and the red-brown coloring agent in most soils and rocks. The presence of natural iron oxide minerals indicates that soil waters are saturated with iron and are incapable of dissolving additional iron.

An additional benefit of the iron oxide materials is their potential to act as a chemical barrier as well as a physical barrier. Iron oxyhydroxide (FeO[OH]) can adsorb metal ions from solution and thus acts as a chemical barrier to isolate buried waste.

Choice of the reagents to produce a waste isolation material such as an iron oxide material is dependent on the waste site requirements and properties. In general, reagents are chosen, which on being mixed, produce an insoluble product which is in equilibrium with the natural environment. For example, the following mixtures can produce iron oxide, oxyhydroxide or related iron compounds, as well as other reaction products, after reacting:

1) Ferric (or ferrous) chloride mixed with sodium hydroxide; or

2) Ferrous (or ferric) sulphate mixed with calcium hydroxide.

Each of these reagent reactions produces insoluble iron oxide (or hydroxide or similar compounds) and another reaction product, together with water. The first reaction will produce an iron oxide (or similar iron compound) with a saline brine, and the second reaction will produce an iron oxide (or similar iron compound) with the mineral gypsum. The saline brine is unacceptable for some applications because the brine might mobilize hazardous components. Gypsum is only slightly soluble and is preferred for most applications, particularly in arid or semi-arid climates.

2. Polymer Grouting Materials

Various thermosetting organic polymers and copolymers can be used to solidify radioactive, mixed, and hazardous waste. These thermosetting polymers do not require heat to be added, but produce a barrier material through chemical reaction. Once formed, a thermosetting polymer cannot be reformed. Suitable organic polymers and copolymers useful in the present invention include those formed from epoxy resins such as ethylene epoxy materials, lignosulfonate epoxy materials, and two-component epoxy systems; acrylic resins such as acrylic acid, methacrylic acid, ethyl acrylate, methyl acrylate, and two-component acrylic resin systems; acrylamide; and the like.

The polymerization of unsaturated monomers such as methyl acrylates is typically a chain reaction. Polymerization can be initiated by the action of a free radical on a monomer molecule, which leads to polymer chains consisting of thousands of monomer molecules. Free radicals can be formed by the decomposition of a relatively unstable material called an initiator or a catalyst. For example, benzoyl peroxide (50% active) can be used as an initiator for acrylic resins. The peroxide molecule splits at the O—O bond and, when subjected to heat or in the presence of a promoter, forms two free radicals that have unpaired electrons and, thus, are very reactive.

Promoters can be used instead of heat for ambient temperature curing of catalyzed monomer systems. Promoters (also called accelerators) are chemical compounds that induce the decomposition of the peroxide catalyst by breaking the O—O bond. This reaction can take place at a wide temperature range, depending on the promoter-catalyst system used. This is preferred for in situ applications such as in the present invention. An example of a suitable promoter is N-ethyl,N-hydroxyethyl,M-toluidine.

The polymerization reaction is exothermic and results in an auto-accelerating reaction that must be properly controlled. Cure time depends upon temperature, promoter-catalyst combination and concentration, and admixtures (or contaminants) that may retard or enhance the set. Gel times, which is the time after the resin viscosity increases rapidly and can no longer be poured or worked, can be manipulated easily by the resin manufacturer or the catalyst-promoter supplier.

The polymer grout materials can be formulated to be used in a two-part A and B system in the present invention. For example, Part A can be a resin blend containing a toluidine promoter, and Part B can be a resin blend in which a benzoyl peroxide catalyst is added just prior to use. When parts A and B are mixed (in a 1:1 ratio), the promoter and catalyst are united to start the polymerization reaction.

Figure 11:
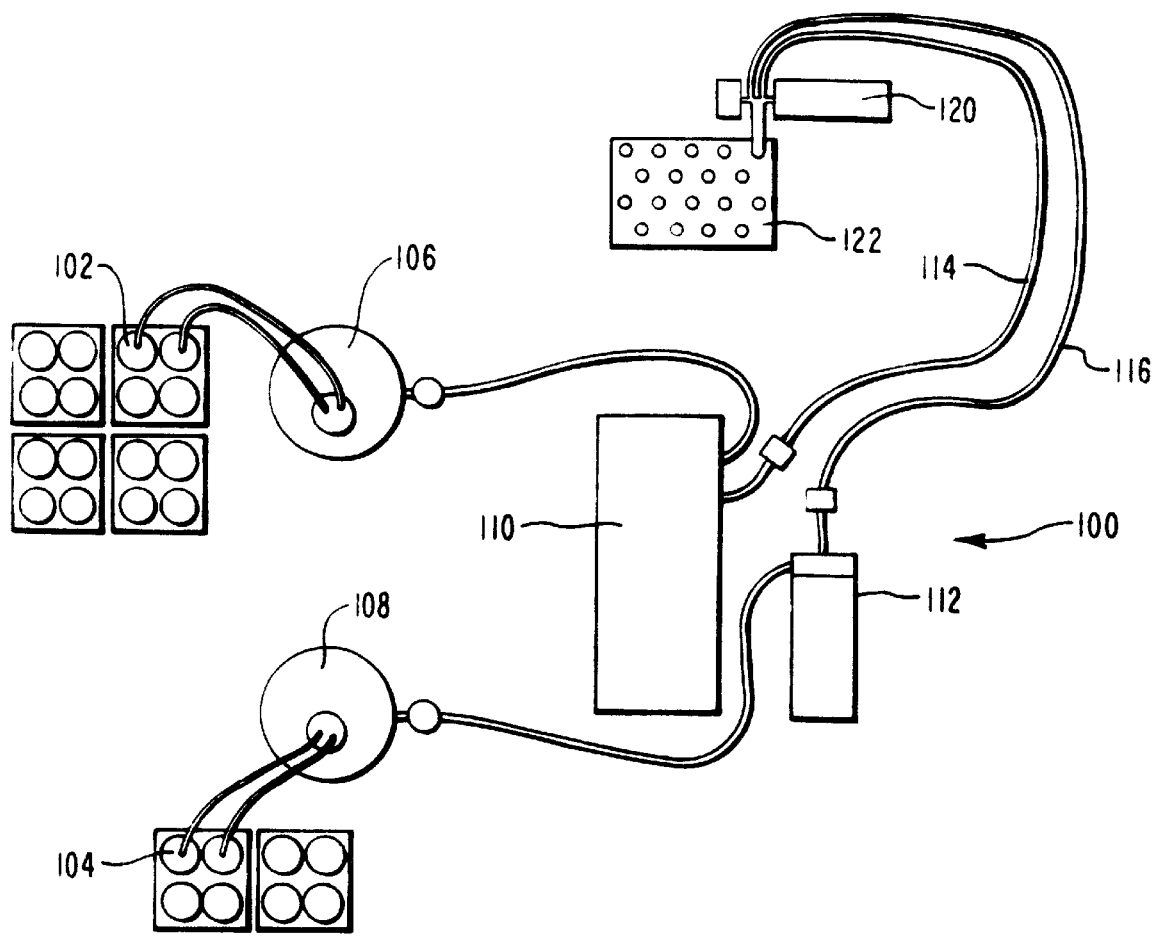
FIG. 11 is a schematic top view of an equipment set up for a two-component polymer grouting material in another embodiment of the jet grouting system according to the present invention.

A schematic depiction of a jet grouting system operation using a two-part A and B system according to the present invention is shown in FIG. 11. There, the two-part system 100 includes a first set of storage drums 102 for the part A resin and a second set of storage drums 104 for the part B resin, which are in communication with a pair of supply tanks 106 and 108, respectively. The supply tank 106 is in fluid communication with a high pressure positive displacement pump 110 (e.g., about 6000 psi), while supply tank 108 is in fluid communication with a pump 112 producing a lower pressure (e.g., about 1000 psi). A high pressure line 114 provides communication between pump 110 and a drilling system 120 deployed at a drilling site 122, while a high pressure line 116 provides communication between pump 112 and drilling system 120.

Figure 12:
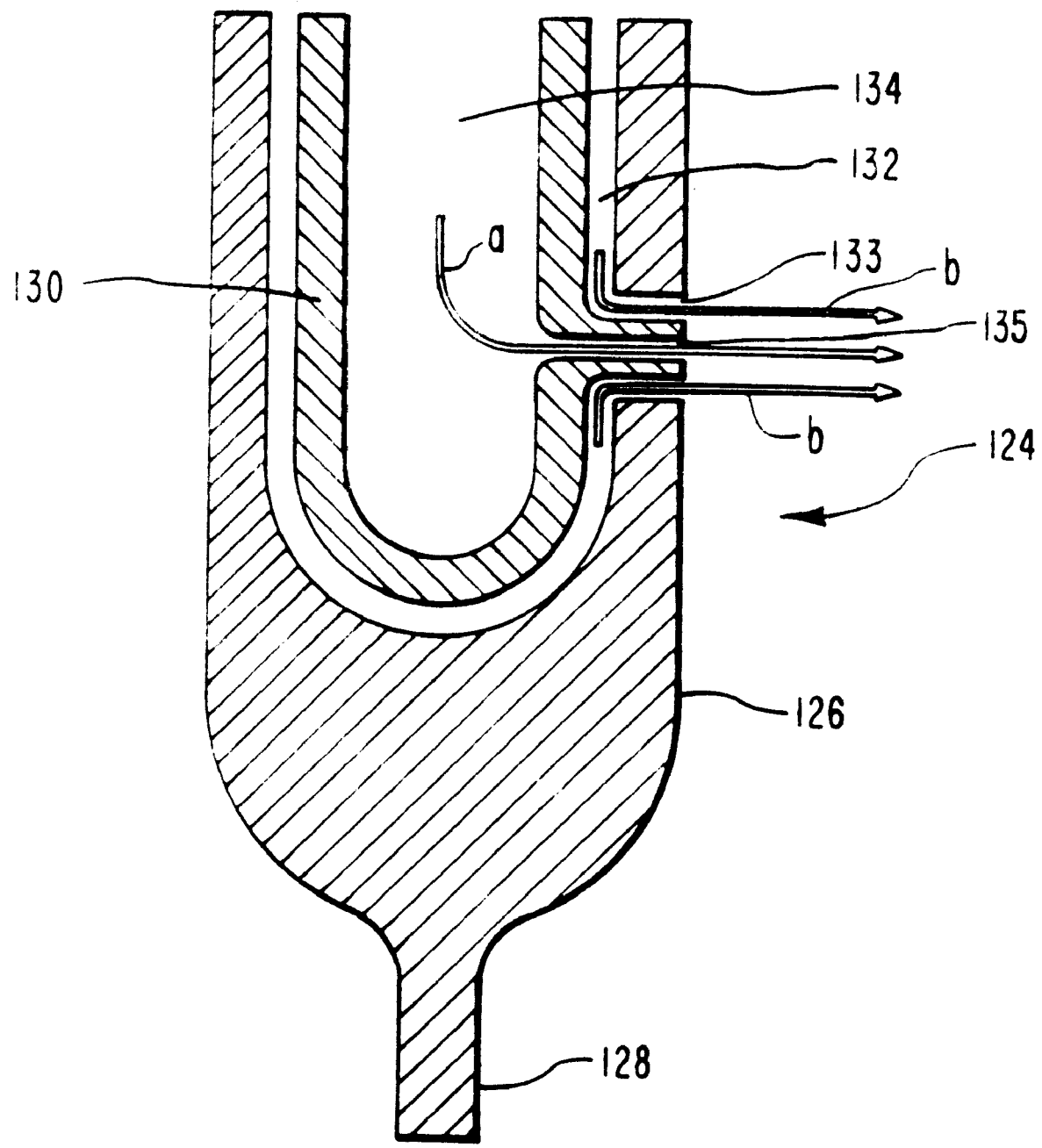
FIG. 12 is a schematic cross-sectional view of a dual concentric annulus drill nozzle used to inject the polymer grouting material in the embodiment of FIG. 11.

The drilling system 120 utilizes a dual concentric annulus drill nozzle 124, illustrated in cross section in FIG. 12, that allows parts A and B to be delivered separately to the subsurface area of injection. This guarantees that polymerization begins only after the resins have left the jet grouting equipment and eliminates the possibility of accelerated curing occurring in and clogging the equipment.

As shown in FIG. 12, the drill nozzle 124 includes an outer drill housing 126 formed with a drill bit 128 at the lower end thereof. An inner drill housing 130 is disposed within outer drill housing 126 such that an outer annulus 132 in communication with an outlet aperture 133 is formed between the outer surface of housing 130 and the inner surface of housing 126. The line 116 from pump 112 is in communication with outer annulus 132 and aperture 133 through which the B part of the polymer grout a is injected as represented by arrow b in FIG. 12. An inner annulus 134 in communication with an outlet aperture 135 is formed within housing 130. The line 114 from pump 110 is in communication with inner annulus 134 and aperture 135 through which the A part of the polymer grout is injected as represented by arrow a in FIG. 12.

The two-part polymer grouting system used with the dual concentric annulus drill nozzle can be used to produce a monolith that is a durable stabilized matrix suitable for either long-term storage of buried waste, or interim storage and eventual retrieval.

D. Jet Grouting Applications

The jet grouting system and materials discussed above can be adapted for use in different application approaches and methods depending on whether long term stabilization or interim storage and retrieval is desired.

1. Jet Grouting with Demolition Grout and Retrieval

In one application approach of the invention, a jet grouting procedure is utilized in conjunction with an expansive demolition grout for easier retrieval of the waste debris. The jet grouting is accomplished using a ground drilling system and a high pressure positive displacement pump as discussed previously. Immediately following jet grouting, thin-walled spiral wrapped tubes are inserted into the grout-filled drill holes and allowed to set in place, thereby forming pre-set access holes. The jet grouting material is allowed to cure into a grout/soil/waste matrix monolith. Following curing of the resulting monolith, a demolition grout is introduced into the pre-set holes defined by the spiral wrapped tubes, which results in fracturing the monolith into easily retrievable pieces. As the demolition grout cures, it expands through the thin-walled spiral wrapped tubes and fractures the monolith in situ. Following the fracturing of the monolith by the expansive demolition grout, remotely controlled retrieval equipment can be used to remove the fractured debris. For example, a backhoe with a thumb attachment can be used for the retrieval operation. The demolition grout used reduces the fracturing required during the retrieval process and also reduces the spread of contaminants.

In another embodiment, an alternative nondust producing technique is to use a hydraulic rock splitter in place of the demolition grout in the spiral wrapped tubes to fracture the monolith.

2. Jet Grouting of Transuranic Waste

The jet grouting technique of the present invention can be used for long term stabilization of transuranic (TRU) waste, or interim storage and retrieval of buried transuranic waste in either a full pit retrieval operation or a hot spot retrieval operation. The term "hot spot" as used herein means an area of higher than average radioactivity. Transuranic pits contain transuranic (transuranium) elements which are radioactive, are products of artificial nuclear changes, and are members of the actinide group. Buried radioactive waste sites have a need to avoid subsidence from void collapse within the waste to ensure cap integrity. Hot spot retrieval of selected material at a buried waste site as opposed to full-pit retrieval may be desirable based on risk analysis scenarios for the buried waste.

In one method, a transuranic waste pit is injected with a grouting material such as a polyacrylamide chemical grout and allowed to cure into a monolith. The grouted waste pit is provided with pre-set access holes prior to curing of the monolith to provide access for placement of an expansive demolition grout. The expansive grout upon curing and expanding, cracks the monolith. A remotely controlled retrieval apparatus such as a bridge crane apparatus consisting of jack hammers, grapples, and shears, is then positioned over the grouted waste pit and the debris is remotely retrieved.

In another method, a stabilized monolith is created in a buried transuranic waste pit by jet grouting a grout material such as a two-component acrylic polymer into the waste pit. The stabilized monolith can be utilized for interim storage and retrieval of a hot spot, with enhanced contamination control and encapsulation. The contamination control of the transuranic material is enhanced during a hot spot retrieval effort by the agglomeration of the contaminants into coarser, less aerosoluble materials by the jet grouting. The formed monolith also provides for stabilization of buried transuranic waste for in situ long term disposal with improved confinement. The acrylic polymer utilized can be selected to be a hard durable material for a long-term encapsulation, or a softer, more easily retrievable material for interim storage and eventual retrieval.

An additional technique involves creating a jet-grouted stabilization subsurface wall surrounding a hot spot in the interior of a buried waste pit. The stabilization wall acts as a barrier for containment of horizontal migration of contaminants in the hot spot during the interim period prior to retrieval, and simultaneously prevents slumping of the surrounding waste material during retrieval. In utilizing this technique, a subsurface wall is created by jet grouting a grout material such as portland cement around a suspected hot spot in the buried waste pit. The wall allows near vertical digging in the waste pit when removing the hot spot thereby reducing the amount of contaminated transuranic material excavated to remove the hot spot, and the wall also provides a structural support to digging operations. The wall can have different shapes such as a U-shape, V-shape, square-shape, etc., depending on the configuration of the buried waste. In addition, the wall can also be applied to any hot spot that is simply contaminated soil in which it is desired to contain horizontal migration of the contaminants prior to a retrieval action.

In another technique, a stabilized monolith is created in a buried waste site by forming a jet-grouted stabilization wall such as from portland cement around the perimeter of a hot spot, and then jet grouting the soil/waste area interior of the wall with a softer material such as paraffin or a polymer grout. This allows for easier retrieval of the grouted hot spot while providing protection from cave-ins during the retrieval operation.

3. Jet Grouting with In Situ Vitrification

The jet grouting technique of the invention can be used in a pretreatment method for a buried waste site prior to in situ vitrification (ISV) or glassification of the buried waste. The jet grouting/ISV approach is preferably used at a waste site containing large voids and/or containers filled with potentially combustible and/or vaporizable materials. This combination of two containment and stabilization technologies provides enhanced contaminant control that significantly engineers around risks associated with melt pressurization during ISV. The jet grouting/ISV approach is particularly useful in the containment and stabilization of TRU-contaminated soil/waste sites.

In the jet grouting phase of the jet grouting/ISV approach, the buried waste site is pretreated with jet grouting by driving the drill stem of a drilling system into the buried waste at pre-selected spacings, followed by the high-pressure injection of grouting materials as previously described. Drill stem placement can be designed to guarantee the breach of all large containers (including vaults) or drums present in the buried waste matrix. Thus, the spacing of the drilled holes in the waste can be defined by both the type of sealed containers expected to be present, as well as the permeability of the resultant grout material that is chosen. The grouting material fills all of the void spaces in the buried waste matrix and mixes with any free liquids in the waste. In addition, the high pressure nature of the jet grouting (e.g., about 6000–8000 psi) is sufficient to fracture or collapse most of the small glass or plastic containers that have not been breached by the drill-stem placement. The resultant grouted buried waste matrix is essentially free of most sealed containers, due to the breaching nature of the grout drilling, and all voids in the surrounding soil and in the breached waste containers are filled with grout. Thus, problems with sealed containers and large voids are minimized or eliminated by jet grouting the buried waste prior to performing ISV at the site.

The grout material used in the jet grouting/ISV approach can be any of those discussed previously. In particular or in addition, suitable grout materials include portland cement, sodium tetraborate, flyash, calcium silicate, or a combination of these materials, as well as other ceramic oxides. The grout material can be specially formulated to completely fill up all void spaces in the buried waste matrix, mix with any free liquids, and provide adequate levels of glass formers and electrically conductive materials (if necessary). The use of glass formers (e.g., silica, alumina, etc.) and electrically conductive materials (e.g., sodium tetraborate) in the grout material can also make the jet grouting/ISV approach more economical by lowering the melt temperature and decreasing the ratio of horizontal to vertical melt growth.

If impermeable grout materials are used during the jet grouting phase, such as cementitious materials, the grout solidifies with the waste into a relatively leach-resistant interim stabilization form such as a grout-filled monolith until such time that in situ vitrification is performed.

Vapors are generated under the ISV melt from the grout during ISV processing. Such vapors can be constricted by the surrounding mass underground, which can cause pressurization. Thus, the use of an impermeable grout as a pretreatment for ISV processing requires application of an engineered system for vapor relief, including a vent structure (s) and a splash guard structure, during ISV.

Figure 13:
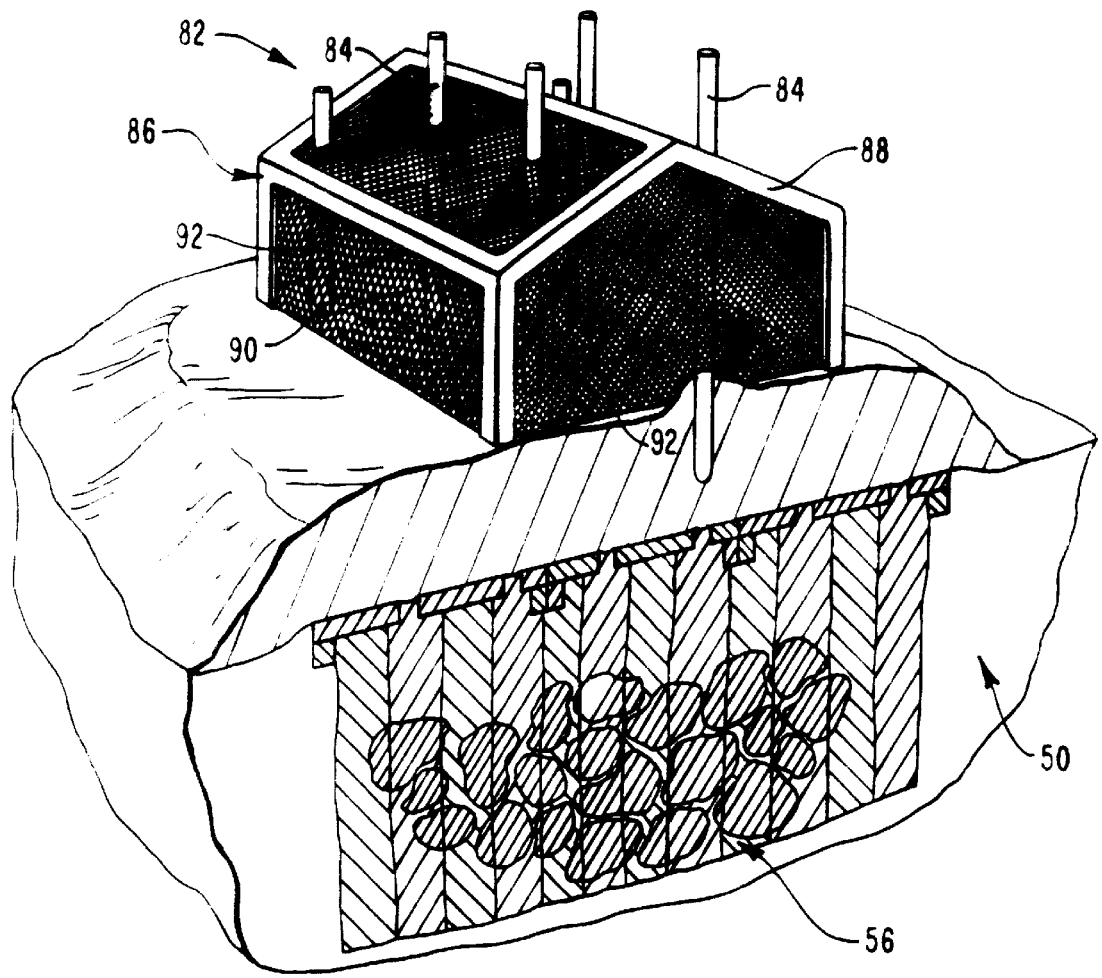
FIG. 13 is a sectional perspective view of a buried waste site in which a subsurface monolith formed by the jet grouting operation of the invention is being treated with the ISV processing technique.

Referring to FIG. 13, a vapor relief system 82 for use during the ISV phase of the jet grouting/ISV approach is depicted. The vapor relief system 82 is used when impermeable grout has been injected during the jet grouting phase prior to ISV processing to mitigate any pressurization that may occur during ISV processing. The vapor relief system 82 includes a splash guard structure 86 provided with a frame 88 for supporting a screen material 90. One or more vent structures 92 extend from the outside of splash guard structure 86 through screen material 90 down into the melt. The vent structure 92 is anchored in a nonconductive manner to screen material 90 or to an ISV hood (not shown) outside of splash guard structure 86. A plurality of electrodes 84 used for ISV processing extend through screen material 90 into the melt. The vent structure 92 and electrodes 84 are preferably made of graphite. One or more vent strucures 92 can be utilized as needed.

A variety of different shaped vent structures can be used as long as the vent structures have a high surface area. Preferably, a solid cyindrical or annular rod made of graphite is used as the vent structure. The vent structure is a preferred pathway for pressures under the ISV melt and forms a vapor pathway such that vapors travel upward along the vent structure. When a graphite rod is used for venting, the graphite acts as a reducing agent, with the carbon in the graphite rod being slowly oxidized in the melt.

Use of a more permeable grout for the pretreatment jet grouting phase may eliminate the need for the vapor relief system during ISV processing. When permeable grouts are used in ISV processing, the vapors can pass through the grout. The term "permeable" grout used herein refers to a pumpable grout material that fills all voids in the soil/waste matrix, but cures into a porous matrix that allows for hydrated water and vapor release, prior to incorporation in the melt. Suitable permeable grout materials include air entrained grouts, materials with high nucleation rates, and granular non-setting (non-cementitious) materials (e.g., silica sand, soil) with or without low molecular weight carrier fluids (e.g., evaporative organic liquids). An example of a suitable permeable grout is a mixture of clay and zeolites. Permeable grouts should only be used, however, if the pretreatment jet grouting is quickly followed by ISV processing.

The applied grout material can be customized to each site in order to improve the processability of the waste and the durability of the resultant glass matrix. The customized grout can also be used in an interim stabilization approach for the buried waste, eliminating the need to glassify the waste until sufficient data exists to consider whether in situ glassification is ready for implementation at the buried waste site.

The ISV phase of the jet grouting/ISV approach involves joule-heated vitrification from the ground level to below the preformed grout/waste monolith. Joule heating is used to melt the grout/waste monolith and surrounding soil into a durable glassy ceramic waste matrix that incorporates hazardous inorganic contaminants such as TRU materials into the glassy ceramic matrix while destroying the organic contaminants in the waste. The durable nature of the glassy ceramic waste matrix is similar to that of basalt or obsidian, and is expected to provide sufficient waste form longevity to stabilize TRU contaminants over their lifetime. Use of risk-free ISV processing (via grout pretreatment) provides a level of stabilization greater than standard in situ stabilization technologies.

If permeable grout is used, any water injected into the buried waste matrix as part of the grout material will be evaporated off at a constant rate during ISV processing, unencumbered by packaging. Even at high offgas rates, the constant rate of evaporation can be easily handled by an offgas system placed over the vitrified melt. Thus, the grout materials release water vapor at a high but relatively constant rate to the ISV offgas system, without any overwhelming surges. If impermeable grout is used, application of the vent structure(s) shown in FIG. 13 is required, in order to provide a pathway for vapor release through the melt (although issues associated with pressure release from containers are still eliminated).

A preferred method for the ISV phase is disclosed in U.S. Pat. No. 4,376,598 to Brouns et al., the disclosure of which is herein incorporated by reference. In this method, at least one pair of electrodes is inserted at spaced positions from one another into the soil overburden. Preferably, the electrodes are inserted into the soil in substantially parallel upright positions. An initial electrically conductive resistance path is provided in the soil across the electrodes. Electrical current is passed through the electrically conductive resistance path by applying current to the electrodes in order to heat the monolith or soil about the path to melting temperatures, thereby establishing a current-carrying pathway through the molten monolith or soil between the electrodes. Application of current to the electrodes is continued until the monolith or soil between and adjacent to the electrodes has been melted. The electrodes can be moved within the boundaries of the melted monolith or soil as needed. The application of current to the electrodes is then terminated to permit cooling and solidification of the melted monolith or soil into a vitrified solid mass of glass-like material. A gas-impervious cover can be utilized to enclose the treated area adjacent to the electrodes in order to remove gaseous materials that evolve during the vitrification process.

In an alternative embodiment, a "bottoms-up" non-joule-heated approach to in situ glassification may be used instead of the ISV process in order to form a glassified matrix of grout, soil and waste. The smaller volume of vitrified material formed in this approach may require additives to maintain the necessary waste form quality. The grout material can be used as the medium for transporting such additives to the waste.

The jet grouting/ISV approach can be used for both final in situ disposal of buried waste, and for interim in situ treatment of buried waste prior to retrieval and ex situ disposal. A demolition grout can be applied prior to retrieval in order to ease recovery of the glassified monolith matrix. One approach for applying the demolition grout includes drilling holes into the center of the electrodes and/or vent rods left in place in the hardened glassified matrix, and then pouring the demolition grout into the holes. This minimizes glass dust/fines creation since coring of the glassified matrix is avoided. The use of the demolition grout effectively fractures the glassified matrix without any significant dust creation, aiding in the retrieval process.

By glassifying the grouted waste first, followed by fracturing, the contaminants are locked up in the glass-like matrix with virtually no contamination spread. The retrieved glassified waste form can be easily packaged and shipped, with much less stringent requirements than conventional "retrieve and treat" options. The reduced contamination control concerns also allow the retrieval operation to be performed under a less expensive weather structure, sans ventilation and negative pressure. In addition, because the main contaminants have either been eliminated (e.g., volatile organics) or incorporated into the glass-like matrix (e.g., plutonium), it may be possible to perform a manual excavation of the site, thus reducing both capital and operating costs associated with the retrieval operation.

Use of the present jet grouting technology in a pretreatment method for buried waste followed by ISV has many advantages. Pressurization concerns associated with in situ glassification of buried waste sites containing voids and sealed containers filled with vapor generating materials is minimized or eliminated, while maintaining the in situ advantages associated with ISV processing. In addition, sealed container integrity is destroyed less energetically than vibratory rod technologies, thereby minimizing the potential for contaminant spread.

The jet grouting/ISV approach is a much less costly containment and stabilization solution for buried waste compared with conventional retrieve and treat methods. Because of its significantly reduced contamination control concerns, it is estimated that the glassified soil/waste formed in the jet grouting/ISV approach can be retrieved and packaged to meet current DOE transuranic waste repository criteria for a fraction of the costs associated with standard retrieval operations. Even more significant cost reductions occur with not having to retrieve or pay for disposing of the waste if the glassified waste matrix is left in place.

A potential concern in using the jet grouting/ISV approach is the possibility of thick walled compressed gas bottles or cylinders that are still filled and residing in a buried waste site. The concern is that the compressed gas cylinders might not be breached and filled with grout during jet grouting, and that the drill stem would bend around the compressed gas cylinders, rather than go directly through them. This could result in a sudden gas release and/or a cylinder projectile release during ISV processing. However, the potential of this occurrence is minimal, and any potential pressurization resulting from a compressed gas cylinder can be designed around via secondary containment. In addition, other options are available to further mitigate the effects associated with pressurization caused by the sudden release of compressed gas cylinders. The estimated release time for a sudden surge can be designed around via a surging offgas system.

E. Other Advantages and Uses

The present invention is an innovative approach to the global need for the permanent remediation of hazardous waste sites. The increasing concern for the environment has resulted in major steps by the Environmental Protection Agency (EPA) to ensure that the environment is cleaned up in a manner that is both rapid and permanent. With the new regulations that are being implemented by the EPA, it is vitally important that any technology used be permanent. The present invention provides a permanent method for the remediation and storage of contaminated waste, while being a low cost, safe solution for the encapsulation of contaminated, radioactive and other types of waste.

The techniques of the present invention can be utilized at federal government waste sites having mixed and hazardous waste, as well as at other local government and private waste sites throughout the United States and in other countries. The techniques of the invention can also be used to encapsulate old sanitary landfills, as well as at sites of hazardous spills. In addition, the invention can be utilized for municipal landfill remediation. Presently there is no accurate count of contaminated waste landfills in the United States, but there is a major concern for the environment around municipal waste dumps and ground water contamination due to leaking landfills. The present invention offers a cost effective, simple remediation technique for this area.

A major concern for every industrial company involved in waste management is the question of costs. Companies that produce waste are concerned with how cheaply they can dispose of the waste. The present invention uses a relatively small amount of grout in the encapsulation process. This, combined with the fact that the waste does not need to be removed, has the potential to save millions of dollars. Since the waste can be remediated in situ there is very little cost associated with the preparation of the material for cleanup. Thus, the techniques of the invention can be carried out at a much lower cost than prior treatment technologies for buried waste.

The jet grouting techniques of the present invention can be employed not only at mixed and hazardous waste sites, but for a variety of other purposes. For example, the invention can be used at building construction sites for ground stabilization, and in mining operations to provide a barrier for leach extraction and isolation of ore. The invention can also be used for in situ slope stabilization, and for making foundations in permafrost areas. The specific embodiments discussed above should not be construed as limitations on the scope of the invention, but rather as exemplifications of preferred embodiments since many variations are possible. In addition, the following examples are given to illustrate the present invention, and should not be viewed as limiting the scope of the invention.

EXAMPLE 1

A plastic pipe 4 inches in diameter and having a carbon steel drive point attached to the bottom thereof is driven into the ground at a selected buried waste site using a standard steel drive rod placed inside the plastic pipe. Once inserted into the ground, a high pressure inner pipe with four 2.5 mm nozzles at the bottom thereof is placed into the plastic pipe and a standard packer is used to pack off the bottom. A high-pressure hose is attached to the inner pipe which leads to a high-pressure injection pump (e.g., about 11,000 psi). A ratchet assembly is used to hold the inner pipe in position and a thrust block placed over spacers is used to attach the ratchet assembly above the ground surface. The inner pipe is gradually retracted while being precessed in approximately 4 increments of about 30 seconds each at any given axial position step during jet grouting. The inner pipe is precessed to obtain complete coverage of the subsurface area being treated at any given step (e.g., about 1 inch per step). The grout cuts the plastic pipe and penetrates the soil/waste matrix to form a grout/soil/waste agglomeration column having a diameter from about 18–28 inches. The plastic pipe is destroyed in the process and becomes part of the grouted matrix as the jet grouting takes place. This process is repeatedly carried out on centers spaced about 14–24 inches apart such that a plurality of holes are filled with grout, which overlap to form an underground monolith of encapsulated waste.

EXAMPLE 2

An entire simulated waste pit was jet grouted using the techniques of the present invention. A simulated waste pit, having a size of 10×10×10 ft, was constructed using 55-gallon cardboard and steel drums, as well as 4×4×4 ft cardboard boxes full of simulated waste. Each container had a random dump of about 200 g of rare earth tracer to simulate a worst case loading of a transuranic contaminant. A large weather shield was erected over the site and air samplers were used. An alternating triangular pattern drilling approach was used so that there was more potential to puncture each container in the pit, especially vertically oriented drums. Skipping to various positions in the pit was done to avoid causing the grout injected in one hole to push soilcrete mixtures up adjacent holes.

A typical grouting cycle involved the following steps. A spoils collection pit (about 1 ft in diameter and about 1 ft deep) was dug in the position of the proposed grout hole. A CASA GRANDE drill system was positioned over the desired grout hole and the drill stem was inserted into the pit about 12 ft or to the point of refusal. The jet grouting operation was then started, which involved simultaneously pumping grout at nominally 6,000 psi while withdrawing the rotating drill stem at a preprogrammed rate. The drill stem was withdrawn in 5-cm steps at a rate of 6 seconds per step and with a rotation of 2 revolutions/s at each step. The grouting was stopped at about the 4-ft level or if copious amounts of grout emanated out of the top of the pit. Once the drill stem was withdrawn, a 2-inch diameter thin-walled spiral wrapped tube was inserted by hand into the hole. After insertion, the spiral wrapped tube was trimmed with a hack saw to about 9 inches above the surface of the pit and a metal fence post was inserted with the driving point end upward to counter the buoyancy forces caused by the grout. The thin-walled tube was sealed on the bottom prior to insertion by crimping the bottom and applying duct tape.

The jet grouting phase was accomplished with minimal dust spread and no rare earth tracer spread above background. A total of 36 holes in a triangular matrix were successfully jet grouted with a total volume of about 24 yd$^3$ of a 1:1 portland/water mix on a mass basis to form a grouted monolith. The hole spacing was 24 inches on a triangular basis and the process took about 40 minutes to drill and jet grout each hole. During the jet grouting operation, soilcrete and some waste in the form of sludge came to the surface of the pit. Although this material contained the rare earth tracer, no airborne spread of the tracer was found above background on the air samplers spaced systematically around the pit.

Following completion of the grouting operation, the pit was allowed to cure, and a demolition grout (available from BRISTAR) was emplaced in the spiral wrapped tubes. During the curing process prior to application of the demolition grout, the water originally in the jet grouting material hydrated with an exothermic reaction, which caused a large temperature increase in the pit. The temperature at the bottom of the spiral wrapped tubes was measured and recorded using a mercury bulb thermometer over a one week period in each hole. This was done to determine which version of the demolition grout to use, since a variety of demolition grouts could be used depending on the temperature of application. Following application, the demolition grout was allowed to cure for two days, and an access pit was dug adjacent to the grouted pit.

Retrieval was accomplished using a standard backhoe bucket with a special thumb attachment to grasp large consolidated pieces of debris from the monolith, which was removed in just under 5 hours of retrieval time. The retrieval was accomplished with both overburden in place and overburden removed, and it was found that leaving the overburden on promotes both dust and tracer spread during retrieval. Retrieval with the overburden in place resulted in dust removal over the baseline retrieval case of between about 30 and 40%, which compares unfavorably with conventional contamination control cases using misting and fixants where about 70% dust removal has been achieved. However, when performing retrieval with the overburden removed, about 90% dust removal was a ved in the present case. During retrieval with the overburden on, the airborne tracer concentration was 4,000 times background, and with the overburden removed, the tracer concentration was only 1.35 times background.

EXAMPLE 3

A stabilization wall was created using the jet grouting techniques of the present invention. A U-shaped wall was created by jet grouting portland cement (1:1 water/portland cement by mass) in a test pit constructed similar to actual TRU pits. A variety of waste disposal practices were simulated, including random dump and stacked orientations of the containers in shallow land burial. For this demonstration, the wall spanned two zones of the test pit representing random dump drums and random dump drums and boxes. The U-shape was sufficient to demonstrate all features of a four-sided wall. The demonstration had several phases, including jet grouting, excavation/destructive examination, and stabilization evaluation.

For the jet-grouting phase, a total of 52 holes were jet grouted in 3 days to create the U-shaped wall. The sides of the wall were three holes wide on a 2-ft triangular pitch matrix, and the back of the wall was two holes wide. The wall was nominally 30 ft along the back of the U-shape, and the sides of the U-shape extended about 8 ft. A total of about 24 yd$^3$ of portland cement was used, for an average of about 0.46 yd$^3$ per hole. Each hole was approximately 9 ft deep, which was the depth of the waste. The operation was accomplished with a minimum (less than 2.5 gal) of grout returns for each hole. A typical jet-grouting operation involved driving the drill stem into the waste and jet grouting at 6,000 psi while removing the drill stem in discrete increments. The 2-ft triangular pitch matrix was sufficient to create a solid wall using the following injection parameters: two revolutions of the drill stem per step; 5-cm withdrawal per step; and 4–6 s on each step.

The wall was shown in stability testing to support a 98,000 lbm trackhoe excavator in an excavation position on the wall without collapse or structural damage. Excavation of the wall showed that the three-hole wide side walls were nominally 6 ft thick, and that the two-hole wide back wall was about 4 ft thick. The wall also had no visible voids. Examination of the wall showed that the grout mixed with the soil and formed a soilcrete material of about 67 wt-% soil and about 33 wt-% grout in some parts of the wall. Other parts of the wall were filled with neat portland cement. There were also striations of clay soil pockets in the wall estimated to be between about 10–20 % of the volume of the wall. In addition, thin tendrils of easily excavated grout extended into the unground interior positions formed by the wall. These tendrils were about 2 inches thick and extended about 2 ft into the waste.

EXAMPLE 4

Stabilized monoliths were created at a waste site by jet grouting two-component acrylic polymer materials using the techniques of the present invention. Two simulated waste pits were grouted respectively with two different formulations of acrylic polymers, one a hard setting polymer material for long-term encapsulation, and the other a softer, eraser-like polymer material to promote retrieval. The hard material was evaluated for its long-term stabilization properties (durability) and the eraser-like material was evaluated for ease of retrieval and enhanced contamination control during retrieval.

An acrylic thermosetting resin manufactured by 3M Company, Inc. was used as the grouting material, with two different formulations of the polymer being used to produce the hard durable material and the soft eraser-like material. The resin was a two-part acrylic resin mixture with a low viscosity and comprised acrylic comonomers of trimethylolpropane-trimethacrylate (TMPTA) and isooctyl acrylate. The two comonomers (equal portions of Part A and Part B) were used with benzoyl peroxide and amine additives to start the polymerization process. The formed polymers made a high molecular weight material that had excellent durability results.

The two simulated buried waste pits were jet grouted using a dual concentric annulus drill stem. The pits were constructed the same as TRU pits and trenches and represented a random dump drum region. The simulated waste containers, including 55-gallon cardboard and metal drums, contained cloth, paper, metal, wood, and sludge. The concept of interim storage followed by retrieval was demonstrated in one pit and long-term encapsulation was demonstrated in the other.

For the soft polymer material pit, a total of 15 holes were jet grouted into a pit 4.5×9×6 ft deep. The injection parameters for jet grouting the two-component polymer were set as follows: a high-pressure injection pump was used at about 6,000 psi to inject the A part of the polymer, and a SCHWING pump injected the B part at about 1,000 psi. The withdrawal step was done in about 3 cm increments, with two revolutions per step and about 2 s on a step. Mixing the two components occurred outside the dual concentric annulus drill stem in the waste/soil matrix. The main cutting force of the jet grout occurred with the A part at about 6,000 psi, with the B part at about 1,000 psi simply mixing with the A part.

Retrieval with a standard backhoe of the soft polymer pit inside a weather shield showed an enhanced dust control over retrieval involving standard mining techniques. During prior retrieval demonstrations, only about 70% reduction in dust spread occurred when using misting sprays and fixants. However, when retrieving the soft polymer pit, about 91% reduction in dust spread was observed. The soft eraser-like polymer monolith was easy to remove and behaved similarly to wet clay in consistency.

A total of 18 holes were jet grouted in the hard polymer material pit (identically constructed as the soft polymer material pit), and a destructive examination using a backhoe showed that the hard acrylic polymer material resulted in a cured stabilized monolith with no voids. Coring of the hard polymer monolith also demonstrated the solid nature of the grouted pit. During the destructive examination, it was discovered that the hard polymer was easily fractured with a standard backhoe, and the grouted pit could be removed in large cohesive chunks of soil/waste/polymer.

Laboratory durability testing showed that the polymer/soil mixture should result in a stable product for long-term encapsulation and have an extremely low hydraulic conductivity. Durability tests were also performed on laboratory samples of soil and the hard polymer mixed at 33% polymer and 67% soil. The durability tests included hydraulic conductivity measurements, resistance to immersion in water, resistance to immersion in a saturated aqueous solution of trichloroethylene (TCE), resistance to immersion in alkali, and resistance to wet-dry cycling. The hydraulic conductivity of the soil/polymer mix was measured to be 2.8E-12 cm/s. The effect on compressive strength due to water immersion changed from the base-case average of 20.7 MPa to 19.6 MPa after 90 days, for a negligible effect. The effect of TCE on the waste form also showed a negligible change in compressive strength after 90 days of immersion. For the alkali resistance tests (pH=12.5), the compressive strength changed from the base case of 20.7 MPa to 16.2 MPa after 90 days immersion, for about a 20% reduction in strength. For the wet-dry cycling resistance tests, there was also a negligible effect on compressive strength. The cured polymer pits were thus shown to be applicable to both interim storage and retrieval, and to long-term encapsulation with excellent durability parameters.

EXAMPLE 5

Various grouting materials for creating monoliths out of buried waste sites using the jet grouting technique according to the present invention were examined. These materials included a molten low-temperature paraffin, an iron oxide-cement based grout (TECT), and a type-H portland cement. These materials were tested in specially designed cold test pits that simulate buried TRU waste.

Both the TECT and paraffin materials were successfully grouted in a typical buried waste scenario. Grouting of the TECT material was accomplished with minimal grout returns while still filling voids in the pit. The paraffin grouting operation resulted in copious grout returns (about 33% of injected volume). However, the long term multi-day cooling of the molten interior of the grouted pit resulted in considerable permeation of ungrouted soils, leaving all contents of the pit, both soil and waste, virtually soaked in paraffin. Use of both TECT and paraffin in jet grouting of buried waste sites resulted in a cohesive (stand-alone) monolith with essentially no voids.

The TECT material was difficult to retrieve because the resultant soilcrete in the monolith cured to a hard, high compressive strength (greater than about 1,000 psi) material. The paraffin monolith while freestanding was easily retrieved with a standard backhoe and with minimal dust spread. Thus, both of these grout materials can be used in jet grouting TRU waste sites or radioactive contaminated soil zones. Preferably, the TECT material would be used in applications where the monolith is left in an undisturbed state, while the paraffin material would be applied for interim storage followed by retrieval at a later date. The type-H portland cement was also successfully jet grouted in both a culvert full of simulated waste and a pit. The type-H portland cement formed a cohesive monolith following jet grouting.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for stabilizing or pretreating a subsurface area with minimal grout returns, comprising:
   (a) a mobile drilling apparatus including a hollow drill stem with a jet grouting nozzle at the distal end thereof;
   (b) means for dispensing a grout material at high pressure into the hollow drill stem;
   (c) means for withdrawing the drill stem at a predetermined rate of translation and rotation from a borehole formed in the subsurface area while injecting the grout material; and
   (d) a thrust block structured to support the mobile drilling apparatus and having a plurality of holes therethrough which are sized to receive the drill stem.

2. The system of claim 1, wherein the drill stem comprises:
   an outer pipe having a drill bit attached to a distal end thereof;
   an inner pipe disposed within the outer pipe, the inner pipe including a plurality of nozzles at a distal end thereof; and
   means for rotating and withdrawing the inner pipe in a precessed manner from the outer pipe.

3. The system of claim 1, wherein the drill stem includes a dual concentric annulus drill nozzle for injection of a two-part polymer grout material.

4. The system of claim 3, wherein the dispensing means comprises a pair of high pressure pumps for pumping separate parts of the two-part polymer grout material into the dual concentric annulus drill nozzle.

5. The system of claim 1, wherein the thrust block includes a plurality of spacer blocks thereunder.

6. The system of claim 1, wherein the thrust block includes a wiper assembly disposed within at least one of the holes therein.

7. The system of claim 1, wherein the thrust block is formed from a plurality of modular structures.

8. The system of claim 1, wherein the holes in the thrust block are formed in a triangular matrix pattern.

9. The system of claim 1, wherein the drilling apparatus includes a boot placed around the drill stem above the thrust block.

10. The system of claim 1, further comprising a catch cup inserted into at least one of the plurality of holes in the thrust block.

11. A system for stabilizing or pretreating a subsurface area according to claim 1, wherein the drill stem comprises an outer pipe including a drill bit at a distal end thereof and an inner pipe disposed within the outer pipe and having a plurality of nozzles at the distal end thereof.

12. A system for stabilizing or pretreating a subsurface area according to claim 1, wherein the drill stem comprises an outer pipe including a drill bit at a distal end thereof and an inner pipe disposed within the outer pipe and having a plurality of nozzles at the distal end thereof, wherein the grout material is at a sufficiently high pressure to break through the outer pipe.

13. A system for stabilizing or pretreating a subsurface area according to claim 1, further comprising:
    overlapping grout-filled columns in the subsurface area.

14. A system for stabilizing or pretreating a subsurface area according to claim 1, further comprising:
    overlapping grout-filled columns in the subsurface area, wherein the subsurface area includes buried waste material.

15. A system for stabilizing or pretreating a subsurface area according to claim 1, further comprising:
    overlapping grout-filled columns in the subsurface area, wherein the subsurface area includes buried waste material, wherein the buried waste material includes mixed waste, hazardous waste, radioactive waste, or combinations thereof.

16. A system for stabilizing or pretreating a subsurface area according to claim 1, further comprising:
    overlapping grout-filled columns in the subsurface area, wherein the subsurface area includes buried waste material, wherein the buried waste material includes mixed waste, hazardous waste, radioactive waste, or combinations thereof, wherein the radioactive waste includes transuranic elements.

17. A system for stabilizing or pretreating a subsurface area according to claim 1, comprising:
    a stabilized monolith that forms a subsurface wall surrounding a hot spot in the subsurface area.

18. A system for stabilizing or pretreating a subsurface area according to claim 1, wherein the grout material is selected from the group consisting of portland cement, type-H portland cement, concrete, and mixtures thereof.

19. A system for stabilizing or pretreating a subsurface area according to claim 1, wherein the grout material is an analog of natural cement.

20. A system for stabilizing or pretreating a subsurface area according to claim 1, wherein the grout material is an analog of natural cement, wherein the analog of natural cement is selected from the group consisting of iron oxides, iron oxyhydroxides, and mixtures thereof.

21. A system for stabilizing or pretreating a subsurface area according to claim 1, wherein the grout material is an analog of natural cement, wherein the analog of natural cement is selected from the group consisting of hematite, goethite, magnetite, and mixtures thereof.

22. A system for stabilizing or pretreating a subsurface area according to claim 1, the grout material further comprising:
    an expansive demolition grout disposed in preset holes in grout-filled columns.

23. A system for stabilizing or pretreating a subsurface area according to claim 1, wherein the grout material is selected from the group consisting of paraffin, ethylene epoxy, lignosulfate epoxy, two-component epoxy materials, acrylic resins, polyacrylamide, and mixtures thereof.

24. A system for stabilizing or pretreating a subsurface area according to claim 1, further comprising:
    a buried waste site; and
    a weather shield at the buried waste site.

25. A system for stabilizing or pretreating a subsurface area with minimal grout returns, comprising:
    a thrust block placed over a predetermined location at a buried waste site, the thrust block having a plurality of holes therethrough;
    a jet grouting drilling system including a mobile drilling apparatus and a source of grout material, the drilling apparatus including a hollow drill stem with a jet nozzle at a distal end thereof, wherein the drill stem is inserted through a hole in the thrust block;
    a subsurface area containing waste material with a bore hole through the subsurface area; and
    grout material in the bore hole in the form of a grout-filled column.

26. A system for stabilizing or pretreating a subsurface area according to claim 25, further comprising:
    overlapping grout-filled columns forming a stabilized monolith in the subsurface area.

27. A system for stabilizing or pretreating a subsurface area according to claim 25, further comprising a donut device placed around the drill stem adjacent to the nozzle.

28. A system for stabilizing or pretreating a subsurface area according to claim 25, further comprising a hose attached to the drill stem.

29. A system for stabilizing or pretreating a subsurface area according to claim 1, further comprising:
    overlapping grout-filled columns that form a monolith in the subsurface area.

30. A system for stabilizing or pretreating a subsurface area according to claim 1, further comprising:
    overlapping grout-filled columns thereby forming a monolith in the subsurface area; and
    at least one pair of electrodes inserted into soil adjacent to the monolith at spaced positions from one another.

31. A system for stabilizing or pretreating a subsurface area according to claim 1, wherein the monolith is a vitrified solid mass.

32. A system for stabilizing or pretreating a subsurface area according to claim 1, wherein the grout material is a permeable grout selected from the group consisting of air entrained grouts, materials with high nucleation rates, and granular non-setting materials with or without low molecular weight carrier fluids.

33. A system for stabilizing or pretreating a subsurface area according to claim 1, further comprising:

grout-filled columns, thereby forming a monolith in the subsurface area; and at least one vent structure placed into the monolith.

34. A system for stabilizing or pretreating a subsurface area according to claim 1, further comprising:

grout-filled columns, thereby forming a monolith in the subsurface area; and at least one vent structure placed into the monolith, wherein the vent structure is made of graphite.

35. A system for stabilizing or pretreating a subsurface area according to claim 1, wherein the monolith is a vitrified solid mass, further comprising:

demolition grout added to the vitrified solid mass.

36. A system for stabilizing or pretreating a subsurface area according to claim 1, further comprising:

grout-filled columns, thereby forming a monolith in the subsurface area; and at least one pair of electrodes inserted into soil adjacent to the monolith at spaced positions one from another, wherein the electrodes are made of graphite.

* * * * *